United States Patent
Wygnanski et al.

(10) Patent No.: US 6,267,331 B1
(45) Date of Patent: *Jul. 31, 2001

(54) AIRFOIL WITH DYNAMIC STALL CONTROL BY OSCILLATORY FORCING

(75) Inventors: Israel Wygnanski, Telaviv; David Greenblatt, Raanana; Avi Seifert, Tel Aviv, all of (IL)

(73) Assignee: Ramot University Authority For Applied Research & Industrial Development Ltd., Tel Aviv (IL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/092,271

(22) Filed: Jun. 5, 1998

(30) Foreign Application Priority Data

Jun. 26, 1997 (IL) ......... 121164

(51) Int. Cl.[7] ................. B64C 21/00
(52) U.S. Cl. ......... 244/204; 244/207; 244/208; 244/39; 244/35 R
(58) Field of Search ........ 244/204, 207, 244/208, 39, 35 R, 198

(56) References Cited

U.S. PATENT DOCUMENTS

| | | | | |
|---|---|---|---|---|
| 3,774,867 | * | 11/1973 | Quinn | 244/204 |
| 4,169,567 | * | 10/1979 | Tamura | 244/208 |
| 4,693,201 | * | 9/1987 | Williams et al. | 244/208 |
| 4,802,642 | * | 2/1989 | Mangiarotty | 244/204 |
| 4,989,810 | * | 2/1991 | Meier et al. | 244/208 |
| 5,209,438 | * | 5/1993 | Wygnanski | 244/204 |
| 5,359,663 | * | 10/1994 | Katz | 244/204 |
| 5,901,928 | * | 5/1999 | Raskob, Jr. | 244/204 |
| 5,938,404 | * | 5/1999 | Domzalski | 244/204 |

FOREIGN PATENT DOCUMENTS

| | | |
|---|---|---|
| 3320481 A1 | 6/1983 | (DE) . |
| 0 264 144 | 8/1987 | (EP) . |

OTHER PUBLICATIONS

Luttges et al, "Control of Unsteady Separated Flow Structures on Airfoils", ©AIAA, 1985, XP–002123037.*

* cited by examiner

Primary Examiner—J. Woodrow Eldred
(74) Attorney, Agent, or Firm—Mark M. Friedman

(57) ABSTRACT

A method for inhibiting dynamic stall of an airfoil by causing a fluid to flow out of at least one location on the airfoil. This location may be anywhere on the airfoil; but if the location is within one-quarter of the airfoil chord from the leading edge and the fluid flow has non-zero net mass flux, then the fluid flow is modulated at a frequency described by a Strouhal ratio greater than one.

35 Claims, 14 Drawing Sheets

AIRFOIL WITH DYNAMIC STALL CONTROL BY OSCILLATORY FORCING

FIELD AND BACKGROUND OF THE INVENTION

The present invention relates to an airfoil for applications, such as rotary wing aircraft, in which the angle of attack changes rapidly and continuously and, more particularly, to an airfoil designed to control dynamic stall.

Rotary wing aircraft have gained wide popularity, both in the military and in commercial applications, primarily because of their vertical takeoff/landing capabilities and their ability to hover. These capabilities, however, are accompanied by severe limitations such as relatively low maximum flight speeds (typically 150 knots), maneuverability limitations, as well as high maintenance costs resulting from large oscillatory loads on the rotor mechanism. These limitations have their source in a phenomenon known as dynamic stall. Dynamic stall is a highly complex phenomenon containing the traditional problems of transition, turbulence, separation, reattachment, etc., all encapsulated in an unsteady and sometimes three-dimensional and compressible environment. As a natural consequence of its complexity, dynamic stall creates a major problem for helicopter rotor designers. The root of the design problem is an incomplete understanding of the fundamental mechanisms which give rise to the flow structures which characterize dynamic stall. This lack of understanding translates directly into severe limitations in the prediction of rotor-loads, which manifests as a major rotor design constraint.

The dominant feature characterizing dynamic stall on an airfoil is a strong vortical flow, which begins near the leading-edge, enlarges, and then travels downstream along the airfoil. This so-called dynamic stall, or leading-edge, vortex (DSV) consequently brings about abrupt losses in lift as well as sharp increases in drag and strong pitching moments (L. W. Carr, "Progress in the analysis and prediction of dynamic stall", *Journal of Aircraft*, Vol. 25 No. 1, pp. 6–17 (1988)). The rotor designer clearly wants to avoid these undesirable features and to this end almost all research into dynamic stall suppression focuses on controlling or eliminating the leading-edge vortex. Typically, some form of airfoil geometry modification is made (e.g. leading-edge slat), or boundary-layer control (BLC) is employed (e.g. blowing or suction), where these changes are geared specifically to the leading-edge region where the vortex originates. These attempts at containing the DSV are confined to various experimental configurations and numerical studies and have not, as yet, found application in military or civil aviation.

The origin or inception of the dynamic stall vortex is a natural starting point for studies which seek to eliminate or modify it's effect. To date, without exception, all attempts to control the vortex focus on its genesis, because it is ". . . difficult to devise an effective scheme to manipulate this energetic structure after it moves away from the leading-edge . . ." (C. Shih, L. M. Lourenco and A. Krothapalli, "Investigation of flow at the leading and trailing edges of a pitching-up airfoil", *AIAA Journal*, Vol. 33, No. 8, pp. 1369–1376 (1995)). The following is a brief review or various dynamic stall control techniques.

K. L. McCloud III, L. P. Hall and J. A. Brady ("Full-scale wind tunnel tests of blowing boundary layer control applied to helicopter rotor", NASA IN D-335I, 1960) were the first to attempt boundary-layer control of a helicopter rotor. Performing experiments on a full-scale rotor, where blowing emanated from a leading-edge nozzle, they observed a delay in retreating-blade stall. They also suggested cyclic blowing, where BLC is applied only on the retreating blade. In a water-tunnel study, McAlister (see Carr, 1988) ascertained by means of flow visualization that the leading-edge vortex was significantly modified for a momentum coefficient $C_{82}$ =6% and that the vortex was contained at $C_\mu$=45%. G. A. Addington, S. J. Schreck and M. W. Luttges ("Static and dynamic flow field development about a porous suction surface wing", AIAA-92-2628-CP, 1992) applied upper-surface leading-edge suction in an attempt to control dynamic stall on an airfoil undergoing ramp-type motion. Dynamic stall was suppressed for pitch-rates $\alpha^+<0.05$. In an attempt to quantify the effect of the transition region effects, Green & Gilbraith ("An investigation of dynamic stall through the application of leading edge roughness", Paper No 137, $18^{th}$ European Rotorcraft Forum, Avignon, France 1992) investigated the effect of leading-edge transition strips on dynamic stall of an airfoil experiencing ramp-type pitching motion. Significant effects on the upper surface pressure distribution were observed, but quantitative improvements in aerodynamic effects have not been reported. "Air pulses" delivered from a slot at 0.2c, on the upper surface of an oscillatory pitching airfoil, were investigated by M. W. Luttges, M. C. Robinson and D. A. Kennedy ("Control of unsteady separated flow structures on airfoils", AIAA-85-0531, AIAA Shear Flow Control Conference, 1985). From flow visualization studies, an "enhanced flow adherence to the airfoil surface" was observed, when the forcing Strouhal number $F^+$, was greater than 0.25. In addition, under these conditions the air pulses gave rise to an "ongoing process of vortex formation".

L. W. Carr and K. W. McAlister ("The effect of a leading-edge slat on the dynamic stall of an oscillating airfoil", AIAA Paper 83–2533, AIAA/AHS Aircraft Design System and Operations Meeting, 1983) were the first to investigate an airfoil with a leading-edge slat in a dynamic stall environment, and ascertained that the characteristic effect of the DSV was eliminated from the lift and pitching-moment characteristics. C. Tung, K. W. McAlister and C. M. Wang ("dynamics stall study of a multi-element airfoil", 18th European Rotorcraft Forum, Avignon, France, Sep. 15–18, 1992) carried out water tunnel experiments which confirmed the effectiveness of the leading-edge slat as a stall suppression device. It has been pointed out, however, that the addition of slats to a typical in-flight rotor configuration would seriously compromise it's structural integrity. P. Freymuth, S. Jackson and W. Bank W ("Toward dynamic separation without dynamic stall", *Experiments in Fluids*, Vol. 7, pp. 187–196 (1989)) performed flow visualization studies of a pitching wedge-shaped airfoil with a rotating cylindrical nose. In so-doing, they have identified a separated shear layer without the leading-edge vortex. Y. H. Yu, S. Lee, K. W. McAlister, C. Tung and C. Wang C ("Dynamic stall control for advanced rotorcraft application", *AIAA Journal*, Vol. 33 No. 2, pp. 289–295(1995)) examined the concept of the drooped leading-edge such that flow ". . . can pass easily around the leading-edge . . ." without generating the characteristic vortex. In a comparison with the undrooped case, lift hysteresis was reduced, and it was claimed that the characteristic increase in drag coefficient $C_D$ and large negative moment coefficient $C_M$ are reduced by about 40%. The concept of "variable leading-edge droop" was also proposed.

Nevertheless, all methods of dynamic stall control that have been attempted heretofore have been less than satisfactory. There is thus a widely recognized need for, and it would be highly advantageous to have, a more satisfactory method of dynamic stall control for airfoils, particularly in rotary aircraft applications, than the methods known in the art.

SUMMARY OF THE INVENTION

According to the present invention there is provided a method for inhibiting dynamic stall of an airfoil having a leading edge and a trailing edge that define a chord therebetween, including a step selected from the group consisting of: (a) causing a fluid to flow through at least one location on the airfoil within about one quarter of the chord from the leading edge, wherein, if the flow is with a non-zero net mass flux, then the flow is modulated at a first frequency described by a Strouhal ratio greater than about one; and (b) causing the fluid to flow through at least one location on the airfoil beyond about one quarter of the chord from the leading edge.

According to the present invention there is provided a method for inhibiting dynamic stall in an airfoil having a surface, the airfoil moving through a medium, the method including the step of establishing an oscillation in the medium adjacent to a location on the surface of the airfoil.

According to the present invention there is provided an airfoil for motion through a medium, including: (a) an upper surface; (b) a lower surface, the upper surface and the lower surface meeting at a leading edge and at a trailing edge, the upper surface and the lower surface defining between them an interior, the leading edge and the trailing edge defining between them a chord; (c) at least one aperture in a location selected from the group consisting of: (i) locations in the upper surface beyond about one quarter of the chord from the leading edge, (ii) locations in the lower surface beyond about one quarter of the chord from the leading edge, and (iii) locations along the trailing edge; and (d) a mechanism for causing a fluid to flow between the medium and the interior via the at least one aperture.

According to the present invention there is provided an airfoil for motion through a medium, including: (a) an upper surface; (b) a lower surface, the upper surface and the lower surface meeting at a leading edge and at a trailing edge, the upper surface and the lower surface defining between them an interior, the leading edge and the trailing edge defining between them a chord, each of the upper surface and the lower surface having a certain shape; and (c) a mechanism for oscillating a portion of the medium adjacent to at least one location selected from the group consisting of: (i) locations in the upper surface, (ii) locations in the lower surface, (iii) locations along the leading edge, and (iv) locations along the trailing edge.

Although the primary application of the present invention is to rotary wing aircraft flying through air, the scope of the present invention includes airfoils moving through any fluid medium, for example, water. FIG. 1 shows a cross section of an airfoil 10 that includes an upper surface 12 and a lower surface 14 that meet at a leading edge 16 and a trailing edge 18, thereby defining between them an interior volume 20. The distance between leading edge 16 and trailing edge 18 is the chord 22 of airfoil 10. Airfoil 10 moves through a fluid medium 24, with leading edge 16 in front and trailing edge 18 behind. In contexts herein in which airfoil 10 is described as having a single surface, this surface is to be understood to include upper surface 12, lower surface 14, leading edge 16 and trailing edge 18. These definitions are well known, and are recited here only to establish the context of the present invention.

Surprisingly, it has been discovered that dynamic stall is controlled in airfoil 10 by forcing oscillations in medium 24, as medium 24 flows past airfoil 10, at locations in the surface of airfoil 10, for example, leading edge 16, trailing edge 18, location 26 on top surface 12 that is within one quarter of chord 22 of leading edge 16, location 28 on top surface 12 that is beyond one quarter of chord 22 from leading edge 16, location 30 on bottom surface 14 that is within one quarter of chord 22 of leading edge 16, and location 32 on bottom surface 14 that is beyond one quarter of chord 22 from leading edge 16. These forced oscillations are produced by mechanically varying the shape of surfaces 12 and 14 at locations 16, 18, 26, 28, 30, or 32 in an oscillatory fashion, or by causing a fluid to flow to medium 24 from interior 20 at locations 16, 18, 26, 28, 30 or 32. This fluid may or may not be the same fluid as that of which medium 24 is composed. If the fluid that is used to excite the oscillations is the same as the fluid composing medium 24, the fluid flow may be in both directions, both from interior 20 to medium 24 and from medium 24 to interior 20, and this flow may be with or without zero net mass flux. Furthermore, it has been discovered that a similar control of dynamic stall in airfoil 10 is effected by a causing a steady flow of a fluid from interior 20 into medium 24, or from medium 24 into interior 20, at locations in upper surface 14 or lower surface 16 that are beyond one quarter of chord 22 from leading edge 16, such as locations 28 and 32, as well as at locations along trailing edge 18 itself. The experimental results on which the present invention is based are presented below.

The frequency of oscillatory forcing, according to the present invention, is defined by the ratio of two dimensionless numbers, k, the airfoil oscillation Strouhal number, defined as $k = \pi f_o c / U_\infty$, and the forcing Strouhal number, $F^+ = f_f c'/U_\infty$, where $f_o$ is the frequency of airfoil oscillation, $f_f$ is the frequency of oscillatory forcing, c is the length of chord 22, c' is the distance from the point of oscillatory forcing to trailing edge 18, and $U\infty$ is the free stream velocity of medium 24. According to the present invention, if the oscillatory forcing is accomplished with non-zero net mass flux, $f_f$ is chosen to be such that the ratio of $F^+$ to k is greater than about one. This ratio is termed herein the "Strouhal ratio". This non-zero net mass flux oscillatory forcing may be intermittent, or may be quasicontinuous, with the momentum of the fluid in both cases being modulated, either in frequency or in amplitude, at a frequency $f_f$ such that the Strouhal ratio is greater than about 1.

The control of dynamic stall by oscillatory forcing or steady fluid flow far from leading edge 16, according to the present invention, is counterintuitive. Because the DSV begins near leading edge 16, it has been thought that dynamic stall is best controlled by oscillatory forcing or steady fluid expulsion (blowing) near leading edge 16. The experimental results presented below shows that this is not the case. Locations "far from" leading edge 16 are defined herein to be locations farther than about one quarter of chord 22 from leading edge 16.

It should be noted that both steady blowing and oscillatory forcing have been studied extensively in the context of static stall, i.e., under aerodynamic conditions such that the angle of attack of airfoil 10 changes slowly, with an airfoil oscillation Strouhal number k less than about $10^{-3}$. In these studies, it has been conclusively shown that oscillatory forcing, with zero or non-zero net mass-flux, is far more effective for delaying static stall and enhancing lift, than traditional steady blowing. See, for example, A. Seifert, T. Bachar, D. Koss, M. Shepshelovich and I. Wygnanski, "Oscillatory blowing, a tool to delay boundary layer separation", *AIAA Journal*, Vol. 33 p. 2052 (1994). There is currently no adequate theoretical solution nor computational simulation of these flows, but experimental observations indicate that forcing introduces instability-driven, approximately two-dimensional large-eddies which periodically transport "parcels" of high momentum fluid to the surface. As a consequence, the average velocity in what used to be the recirculation zone appears as a thick well-mixed boundary-layer capable of withstanding the higher pressure gradients. Analogously, according to the present invention, oscillatory forcing is preferred over steady blowing.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of an airfoil in which dynamic stall is controlled in a manner superior to those known heretofore. Specifically, the present invention can be used to provide increased lift for rotary wing aircraft.

The principles and operation of an airfoil according to the present invention may be better understood with reference to the drawings and the accompanying description.

Figure 1:
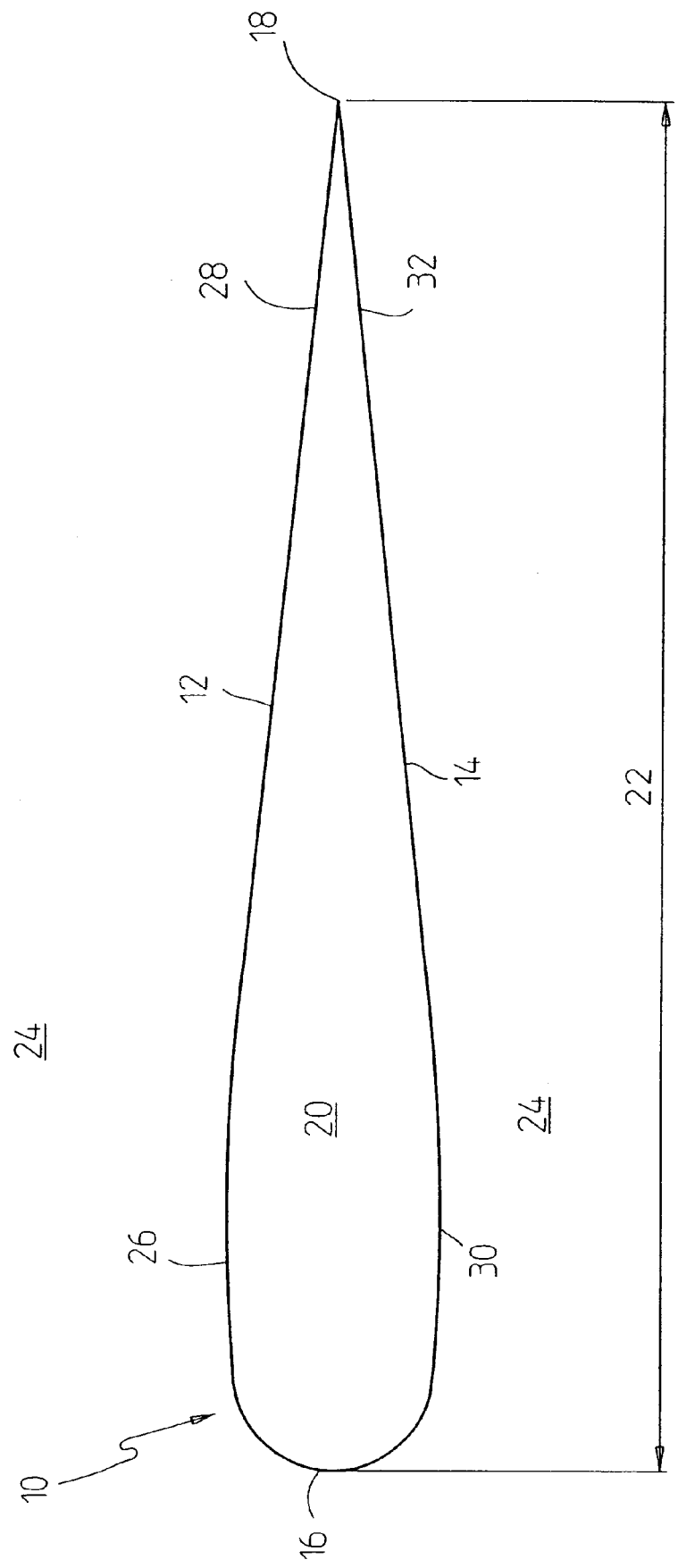
FIG. 1 is a cross section of a generic airfoil.
Figure 2A:
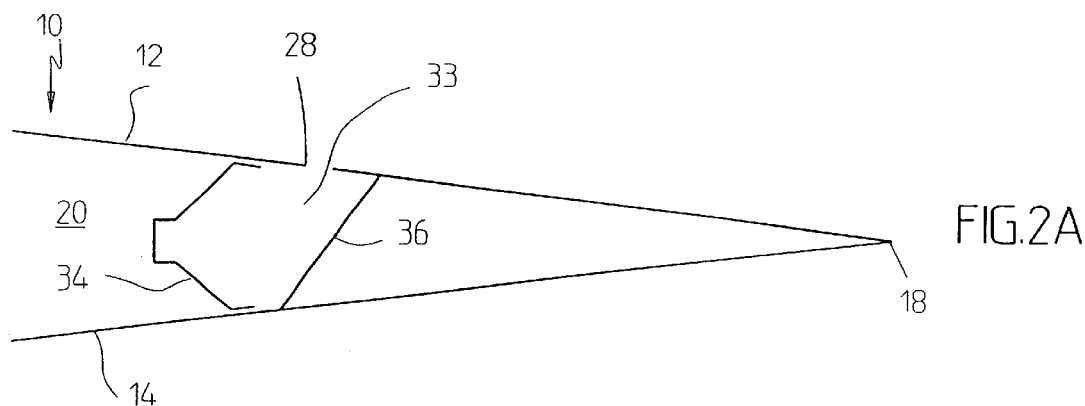
FIG. 2A is a partial schematic cross section of an airfoil equipped with an acoustic speaker.
Figure 2B:
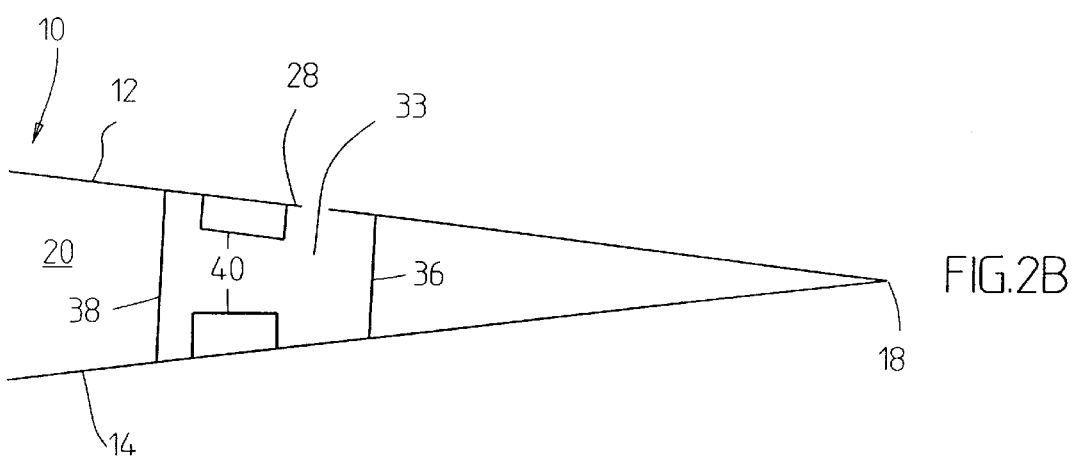
FIG. 2B is a partial schematic cross section of an airfoil equipped with piezoelectric elements for generating sound waves.
Figure 2C:
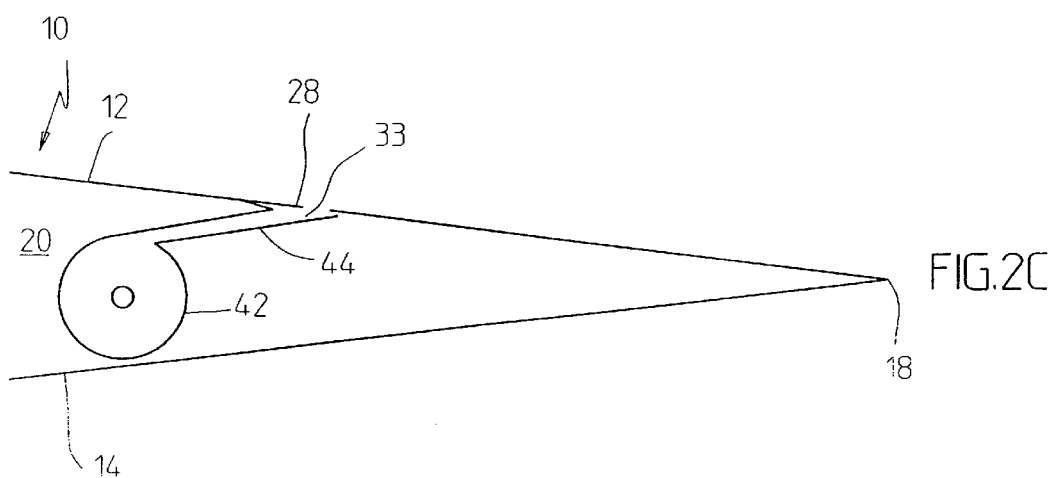
FIG. 2C is a partial schematic cross section of an airfoil equipped with a pump for discharging a fluid from an aperture near the trailing edge.

Referring now to the drawings, FIGS. 2A–2F illustrate various mechanisms for inducing oscillations in medium 24. The mechanisms of FIGS. 2A–2C are based on fluid flow. The mechanisms of FIGS. 2C–2F are mechanical.

FIG. 2A is a partial schematic cross section of an embodiment of airfoil 10 in which an acoustic speaker generates sound waves in a cavity bounded by speaker 34, a barrier 36, and surfaces 12 and 14. These sound waves propagate to medium 24 via an aperture 33 at location 28 in upper surface 12. FIG. 2B is a partial schematic cross section of a similar embodiment of airfoil 10 in which piezoelectric elements 40 are used instead of speaker 34 to generate sound waves in a cavity bounded by barriers 36' and 38 and surfaces 12 and 14. The embodiments of both FIG. 2A and FIG. 2B feature zero net mass flux. FIG. 2C is a partial schematic cross section of an embodiment of airfoil 10 that features non-zero net mass flux. In this embodiment, a pump 42 pumps a fluid out of aperture 33 via a duct 44, either steadily or in regular spurts. The fluid pumped by pump 42 may be either the same as the fluid of medium 24, supplied via an intake (not shown) elsewhere on the vehicle to which airfoil 10 is attached, or a different fluid, supplied from a reservoir (not shown). For example, if medium 24 is air, the fluid pumped by pump 42 may be either air or another gas such as helium or carbon dioxide.

Figure 2D:
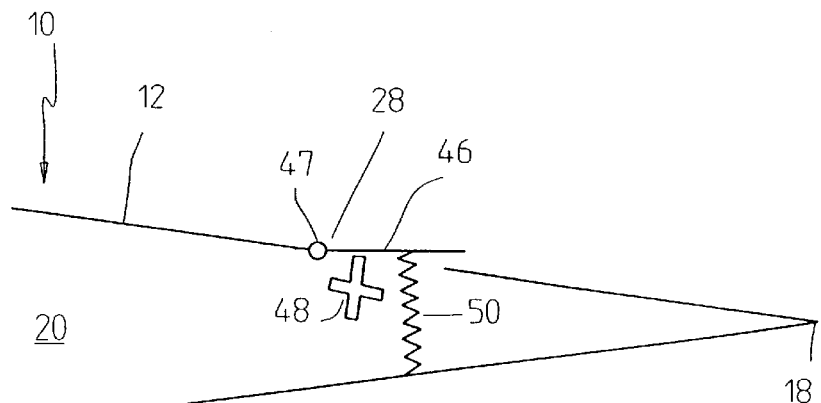
FIG. 2D is a partial schematic cross section of an airfoil equipped with a moveable plate in the upper surface thereof.
Figure 2E:
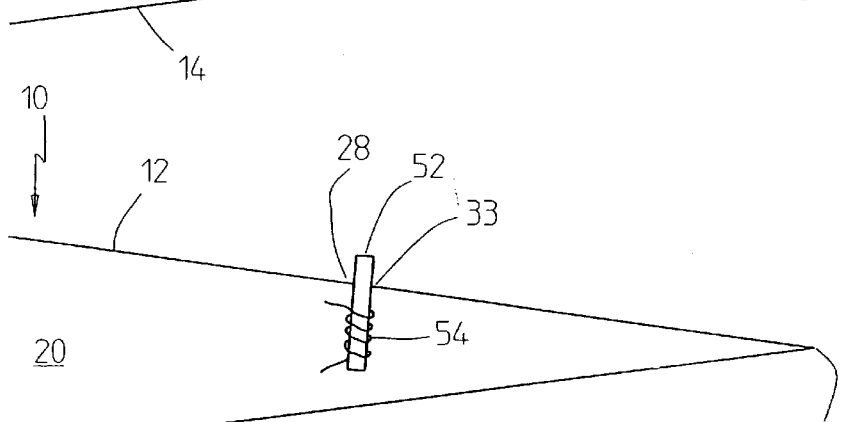
FIG. 2E is a partial schematic cross section of an airfoil equipped with an oscillatory rod.
Figure 2F:
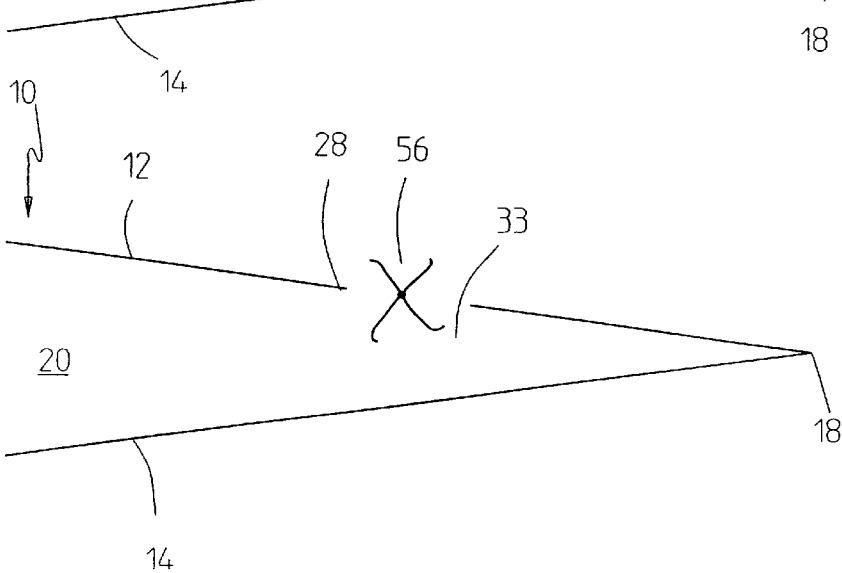
FIG. 2F is a partial schematic cross section of an airfoil equipped with a pinwheel.

FIG. 2D is a partial schematic cross section of an embodiment of airfoil 10 in which upper surface 12 is provided with a plate 46 mounted on a hinge 47 at location 28. Plate 46 is caused to oscillate up and down by a rotating cam 48, which pushes plate 46 up, in opposition to a spring 50 which pulls plate 46 down. This mechanism for oscillating plate 46 is illustrative. Any equivalent mechanism, for example, a piezoelectric drive or an electromagnetic drive, may be used. FIG. 2E is a partial schematic cross section of an embodiment of airfoil 10 in which a rod 52, that includes a permanent magnet, protrudes through aperture 33 and is oscillated up and down in aperture 33 by AC electrical current in a solenoid 54. The embodiments of both FIG. 2D and FIG. 2E are active. FIG. 2E is a schematic cross section of an embodiment of airfoil 10 in which the mechanism for inducing oscillations in medium 24 is passive. In this embodiment, a pinwheel 56 is rotatably mounted in aperture 33. The flow of medium 24 past pinwheel 56 causes pinwheel 56 to rotate, and the resulting reaction force on medium 24 sets up oscillations in medium 24. In an similar, active embodiment, pinwheel 56 may be rotated by a motor.

EXPERIMENTAL

Figure 3:
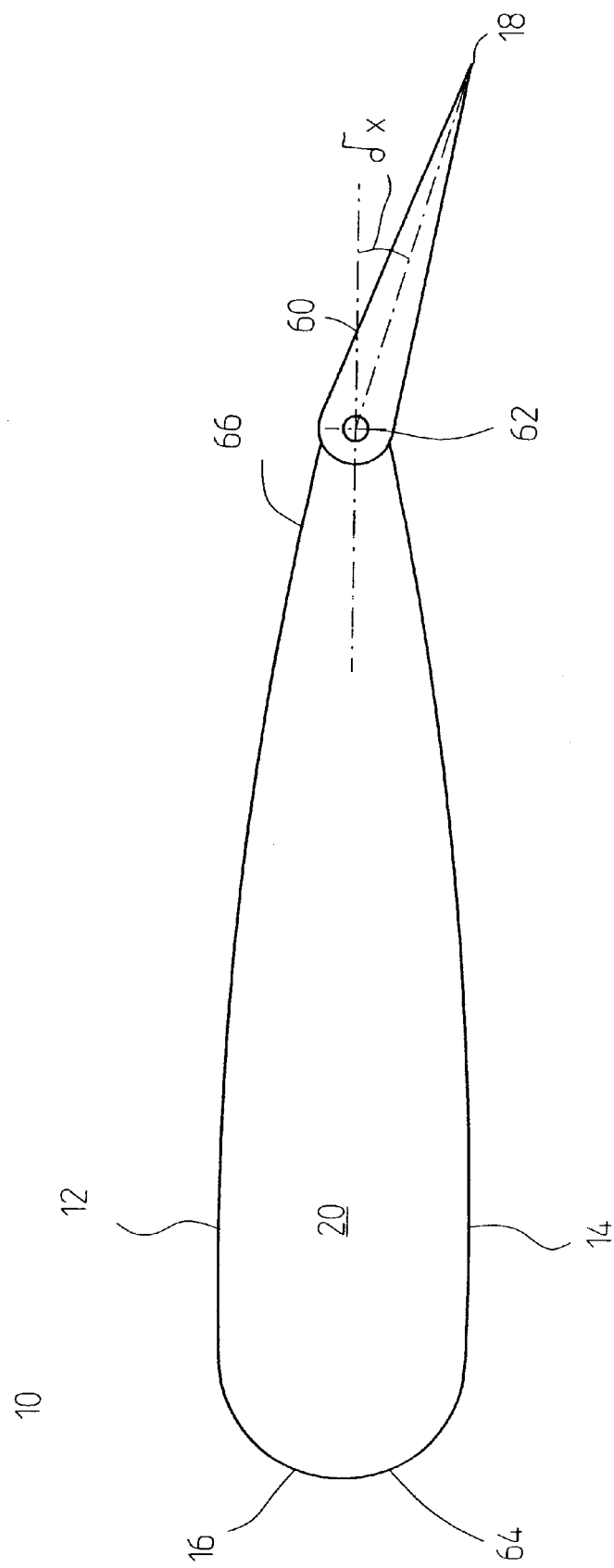
FIG. 3 is a schematic cross section of the airfoil used in the experiments reported herein.

All dynamic stall experiments were carried out on a 365 mm NACA0015 airfoil—a schematic cross section of which is shown in FIG. 3. Airfoil 10' was equipped with 36 pressure taps (not shown) and incorporated a flap 60 whose axis 62 was located at the 75% chord position. The flap angle ($\delta_f$) could be deflected in the range −10° to 30°. The main body of airfoil 10' was essentially hollow with interior 20 serving as a plenum chamber. Two slots were employed independently (never simultaneously) for forcing and blowing, namely: a 1 mm slot 64 at the leading-edge and a 1.5 mm slot 66 at the flap-shoulder. The slot not in use was closed either internally or by means of tape on the airfoil surface.

All dynamic pressure measurements were made with a PS4000 multi-channel array of pressure transducers (AA Lab Systems). The pressure transducers were calibrated for amplitude attenuation and phase shift due to the finite length of tubing between each pressure-tap and transducer. The maximum pressure-transducer frequency of 1000 Hz was more than twice the highest expected forcing frequency, thus satisfying the Nyquist criterion. Each transducer had a maximum amplitude of $\pm 100$ mm $H_2O$ and this limited the experiments to Reynolds numbers $Re \leq 0.3 \times 10^6$ for the current configuration. All pressure data was digitized and transferred via direct memory access to a personal computer, allowing real-time display and acquisition.

The pitch drive system, originally used by R. A. Piziali ("2-D and 3-D oscillating wing aerodynamics for a range of angles of attack including stall", NASA Technical Memorandum 4632 (1994)), generated a sinusoidal pitching motion about the ¼ chord position with less than 1% distortion at the second harmonic. The motion was generated by a crank mechanism consisting of a variable speed DC motor driving a flywheel and crank pin (with adjustable offset for setting the oscillation amplitude), a connecting rod and a pitch arm attached to a shaft mounted on the axis of the ¼ chord position. Care was taken to allow for simultaneous forcing input during oscillations while not inhibiting the 39° range of the system. The oscillation amplitude was adjustable to a maximum of $\pm 5°$ via the crank-pin offset. A shaft-mounted encoder signal was utilized to ascertain the instantaneous incidence angle, and was transferred with the pressure data, via DMA, to the PC.

Forcing was achieved by means of a rotating valve and a small centrifugal blower connected to airfoil plenum chamber 20. The valve was located in a "T"-type configuration such that plenum 20 was open to either the outlet or inlet of the blower, thus generating an oscillatory blowing-suction effect with zero net mass-flux. The dominant frequency of the oscillations and their amplitude were determined by the valve and blower rotational speeds respectively; each rotational speed was independently controlled and monitored by computer. Hot wire calibration of the resulting jets produced at slot exits 64 and 66 was performed within the laminar core region at a number of positions along the span of airfoil 10'. This calibration was used to determine the momentum coefficient $C_\mu = (2h/c)(U_{RMS}/U_\infty)^2$, where h is the width of slot exit 64 or 66 and $U_{RMS}$ is the velocity fluctuation at slot exit 64 or 66. Full details of the system characteristics and accuracy are contained in A. Seifert, T. Bachar, T. Koss, M. Shepshelovich and I. Wygnanski, "Oscillatory blowing, a tool to delay boundary layer separation", AIAA Journal, Vol. 31 No. 11, pp. 2052–2060 (1993).

Figure 4A:
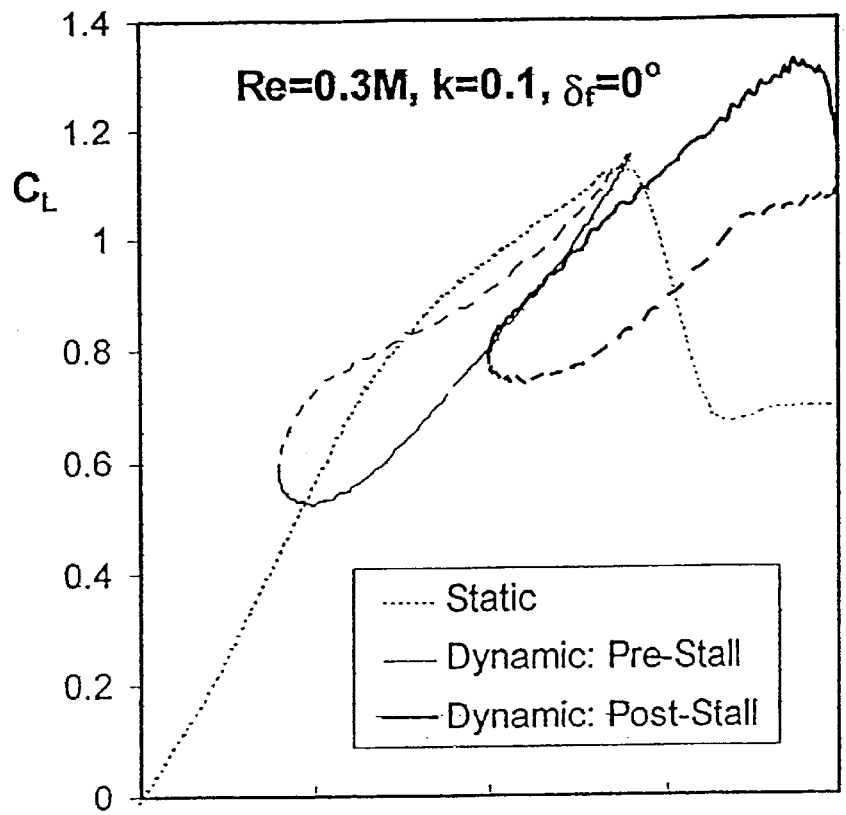
FIG. 4A is a graph of $C_L$ vs. angle of attack for the airfoil of FIG. 3 in the static regime and two different dynamic regimes.
Figure 4B:
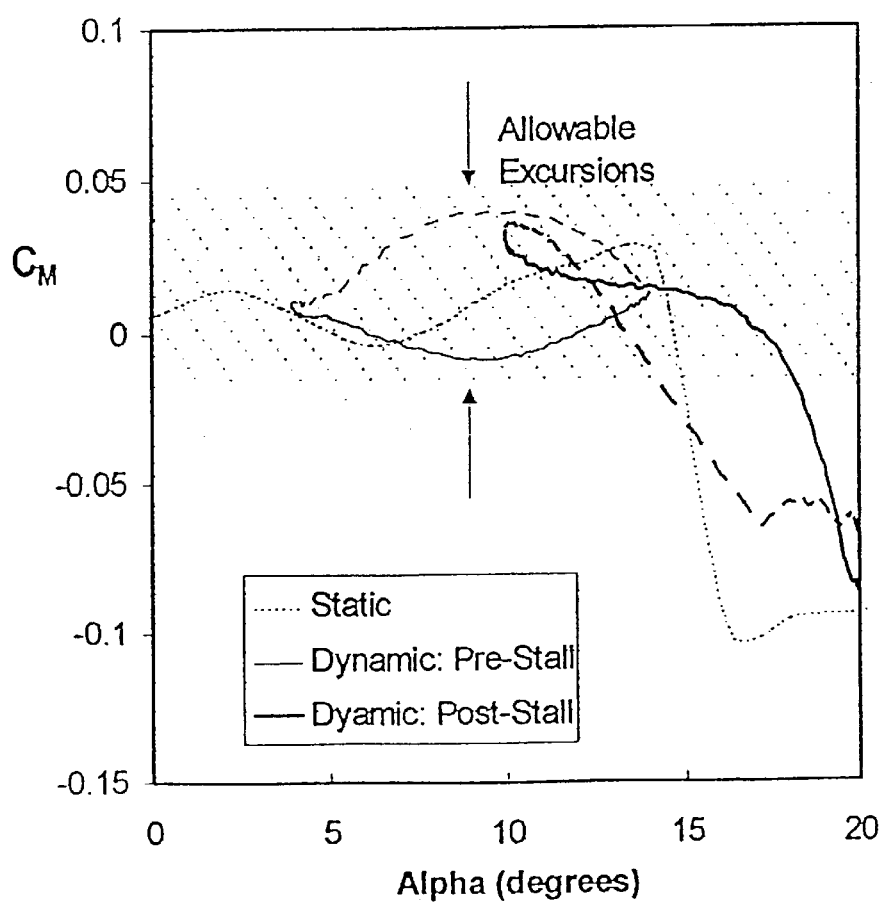
FIG. 4B is a graph of $C_M$ vs. angle of attack for the airfoil of FIG. 3 in the static regime and two different dynamic regimes.

(i) Initial dynamic data, acquired with the configuration described above, illustrated that dramatic effects on integral aerodynamic quantities could be achieved with a relatively small amount of momentum-forcing input, $C_\mu$. Consequently, a detailed parametric study was undertaken where the following modus operandi was adopted:

(a) With reference to FIG. 4, the static-stall angle ($\alpha_s$) was determined for airfoil 10' at a particular Reynolds number.

(b) The mean airfoil oscillation angle was set at $\alpha_s-5°$ and was oscillated at a frequency corresponding to typical airfoil oscillation Strouhal numbers k and ±5° incidence angle excursion (the system maximum).

(c) The pre-stall moment-coefficient excursion, namely: $E_{PS}=C_M(max)-C_M(min)$ was recorded and an arbitrary small tolerance $\epsilon$ was added to the excursions thus defining the maximum allowable excursions: $E_A=(1+\epsilon)E_{PS}$.

(d) The mean incidence angle, with the same (±5°) excursions was then increased into the post-stall regime.

(e) By employing forcing at different frequencies and amplitudes as well as steady blowing, an attempt was made to attain the highest possible maximum lift coefficient $C_L(max)$ for a particular cycle while simultaneously maintaining the condition $E \leq E_A$. No attempt was made to vary the forcing amplitude, i.e. $C_\mu$, within the airfoil oscillation cycle.

In addition to illustrating the strategy, FIG. 4 shows the effect of increasing the mean incidence angle by 6° without forcing or blowing. Clearly, a higher $C_L(max)$ is attained, but the moment excursions are unacceptably large. The strategy described above seeks to maintain or increase $C_L(max)$ while simultaneously bounding the moment excursions to within acceptable values.

For all data presented here $\epsilon=0.2$ was chosen. This choice was arbitrary and it was established that the selection of a smaller or slightly larger value did not influence the overall conclusions of the study.

The large number of parameters associated with this study (resulting in $O(10^4)$ possible combinations) necessitated the elimination of those whose variation was considered less important, although those eliminated from the main body of the investigation were checked on a random basis to ensure consistency of the data. The rule employed for parameter elimination was to maintain as constant the quantities which approximate, as closely as possible, typical dynamic rotor-tip conditions. Then, the effect of forcing, blowing, different configurations, etc. could be investigated. Consequently, an attempt was made to restrict the values of Re, k and $\Delta\alpha$ as follows: Re~$10^6$, k~0.1, $\Delta\alpha$~±5°. These values, with the exception of Re, were attained for this study. The Reynolds number was limited by the pressure transducers, described earlier, to a maximum of $0.3\times10^6$. The parameters were thus: forcing Strouhal number $F^+$(~0.6 to 3.0), RMS or steady momentum coefficient $C_\mu$(~0.01% to 3%), flap deflection angle $\delta_f$(−10° to 20°), mean incidence angle $\overline{\alpha}$ (5° to 18°) and the possibility of either leading-edge or trailing-edge forcing or blowing. Thus, the number of possible combinations was reduced from $O(10^4)$ to $O(10^3)$.

Figure 5A:
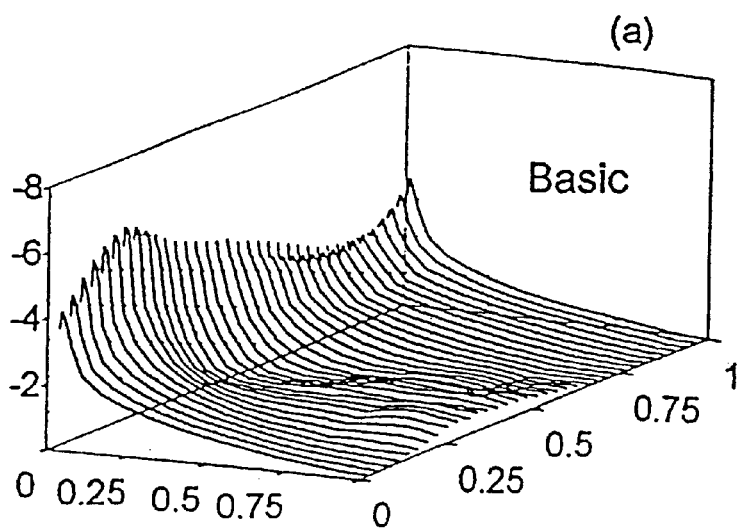
FIG. 5A is a plot of the pressure above the upper surface of the airfoil of FIG. 3, as a function of chord length and time t in an oscillation cycle of angular frequency $\omega$, with the angle of attack in degrees equal to $13+5 \sin \omega t$.
Figure 5B:
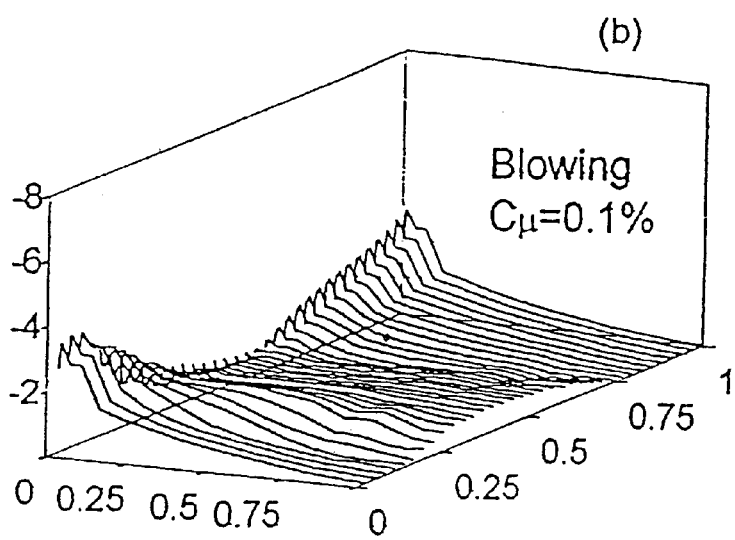
FIG. 5B is a plot similar to FIG. 5A, in the presence of steady blowing at the leading edge of the airfoil.
Figure 5C:
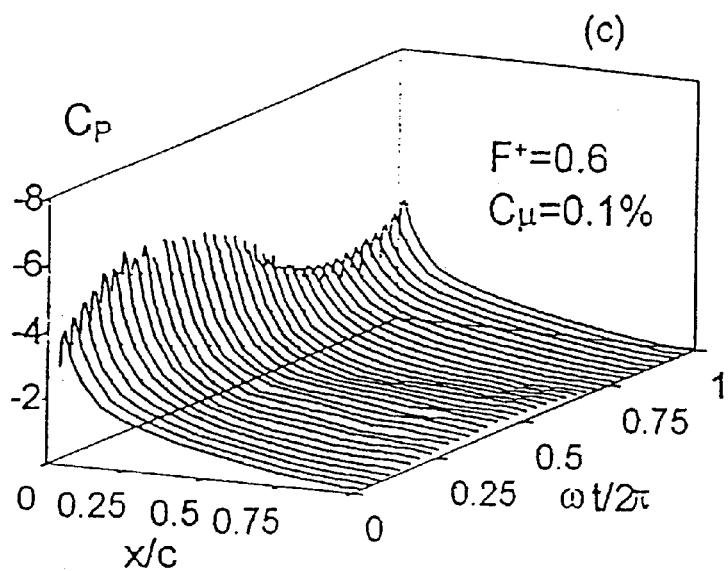
FIG. 5C is a plot similar to FIG. 5A, in the presence of oscillatory forcing at the leading edge of the airfoil.

By way of illustrating the effect of leading-edge steady-blowing and oscillatory-forcing on the airfoil undergoing pitch oscillations, consider FIGS. 5A to 5C. These figures represent instantaneous (not phase-averaged) pressure distributions on upper surface 12 of airfoil 10' as a function of chord length and incidence angle ($\alpha=13+5 \sin \omega t$) for $\delta_f=0°$. FIG. 5A represents the basic pressure distribution (i.e. without blowing or forcing) while FIGS. 5B and 5C represent the same case with steady blowing and oscillatory forcing respectively. In the basic case, a leading-edge vortex forms at approximately 18°, and the DSV moves down airfoil 10' as it pitches down. This can be seen by the dark-shaded approximately constant pressure during the down-stroke between 18 and 8°. On the up-stroke the pressures begin to recover. Contrary to initial expectations, a small steady momentum input has nothing short of a disastrous effect on the airfoil performance. Here, before airfoil 10' reaches 18°, the flow has completely separated from the leading-edge, quickly resulting in massive separation from the entire surface 12 which endures throughout the down-stroke. The pressures only begin to recover when airfoil 10' begins pitching upwards from 8°. In contrast to the above, no significant vortex formation is experienced when forcing at $F^+=0.6$ and the identical $C_\mu$. This is apparent from the leading-edge pressures beyond 18° which begin to drop slowly as the airfoil pitches down. Concomitantly, the separated region apparent for the basic case, is clearly reduced, which implies significant attenuation of the DSV.

Figures 6A, 6B, 6C, 6D:
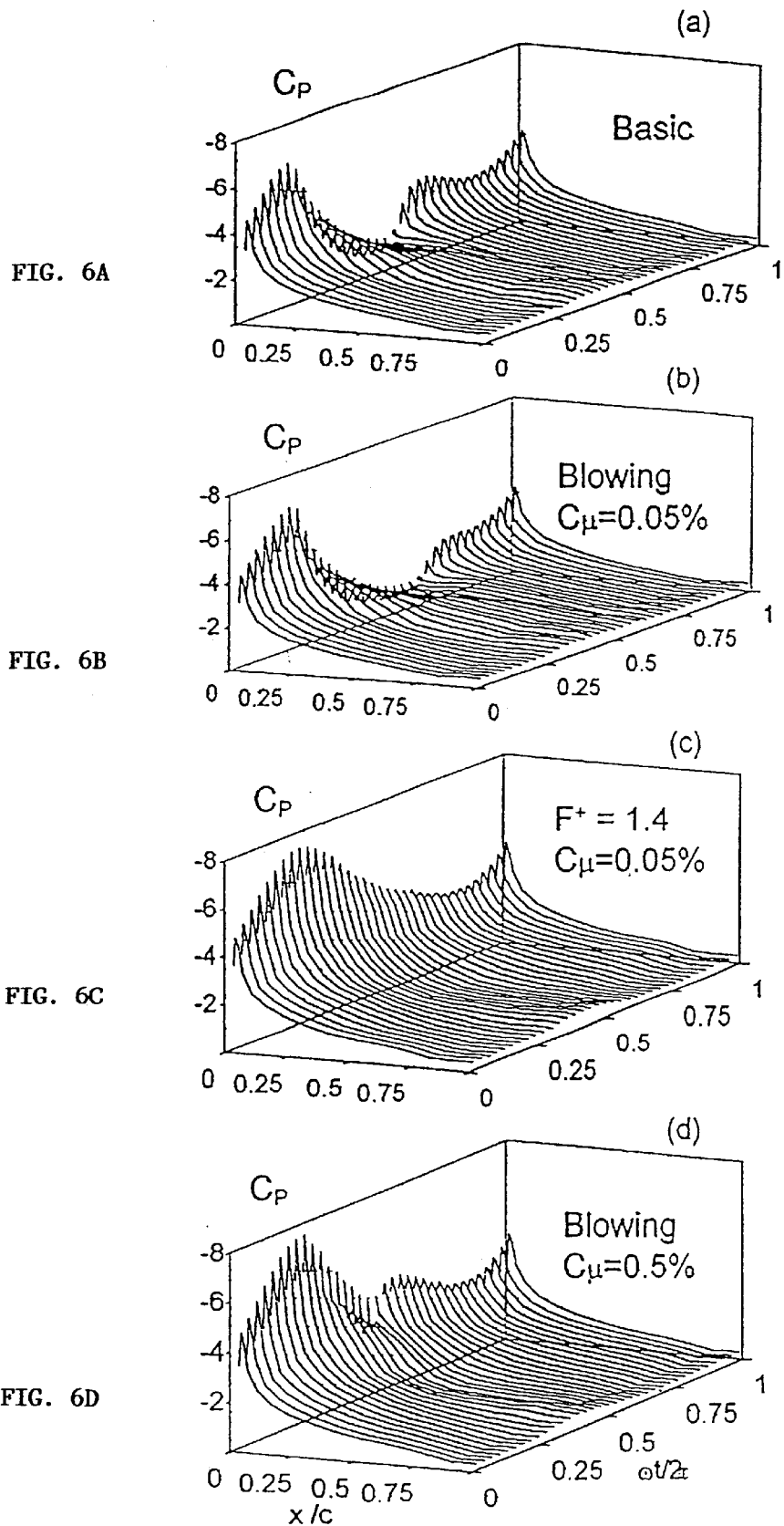
FIG. 6A is a is a plot of the pressure above the upper surface of the airfoil of FIG. 3, as a function of chord length and time t in an oscillation cycle of angular frequency $\omega$, with the angle of attack in degrees equal to $10+5 \sin \omega t$.
FIG. 6B is a plot similar to FIG. 6A, in the presence of steady blowing at the flap shoulder of the airfoil.
FIG. 6C is a plot similar to FIG. 6A, in the presence of oscillatory forcing at the flap shoulder of the airfoil.
FIG. 6D is a plot similar to FIG. 6A, with $C_\mu$ increased by an order of magnitude.

FIGS. 6A–6D illustrate a similar scenario to FIGS. 5A–5C with the following differences: flap 60 was deflected to 20°, blowing and forcing emanated from the flap-shoulder, the mean incidence angle was reduced to 10°, $F^+=1.4$ and $C_\mu=0.05\%$. It is important to note at this point that the flap-angle was held constant throughout the cycle. The intention was not to promote the use of flapped helicopter rotors; rather the flapped configuration was employed here as a means of simulating the effect of aft-loading in the context of the dynamic problem. The basic case represented by FIG. 6A clearly shows the dramatic effect that aft-loading has on the stall characteristics, even at a 3° lower mean incidence angle than the non-flapped case. Here, dynamic-stall occurs in a dramatic fashion from leading-edge 16 and an essentially constant-pressure region exists over the extent of airfoil 10' throughout the down-stroke. The effect of steady blowing with small momentum input, as illustrated in FIG. 6B, has an almost negligible effect on the pressure distribution. However, the same momentum input at $F^+=1.4$ indicates dramatic modification of the pressures, as can be seen in FIG. 6C. Firstly, as airfoil 10' pitches up, the maximum lift is clearly increased as is evident by the higher suction peak. Secondly, the negative symptoms of leading-edge stall are completely eradicated as can be seen by the gently reducing pressure distributions near leading-edge 16. A startling result, certainly in the context of previous attempts at containing dynamic stall, is the fact that flap-shoulder forcing eliminated leading-edge stall. It is presumed that the separation-suppression effect in the trailing-edge region increases the circulation around airfoil 10' and in this way indirectly suppresses separation in the leading-edge region. The question that remains is why steady blowing, which is a well known BLC method when used in conjunction with a flap, does not show significant effects here. The answer to this is given by considering FIG. 6D which illustrates the effect of steady blowing at 10 times the previous momentum input. FIG. 6D shows that an order-of-magnitude additional input of steady momentum is necessary in order to attain a result which is comparable to that of forcing.

It should be noted that similar results were produced for −10°, 0° and 10° flap angle. However, the 20° flap deflection case resulted the largest lift values and in addition a complete set of steady blowing data was recorded for this configuration allowing for a detailed comparison. Flap forcing for the 0° case is presented below.

Figure 7A:
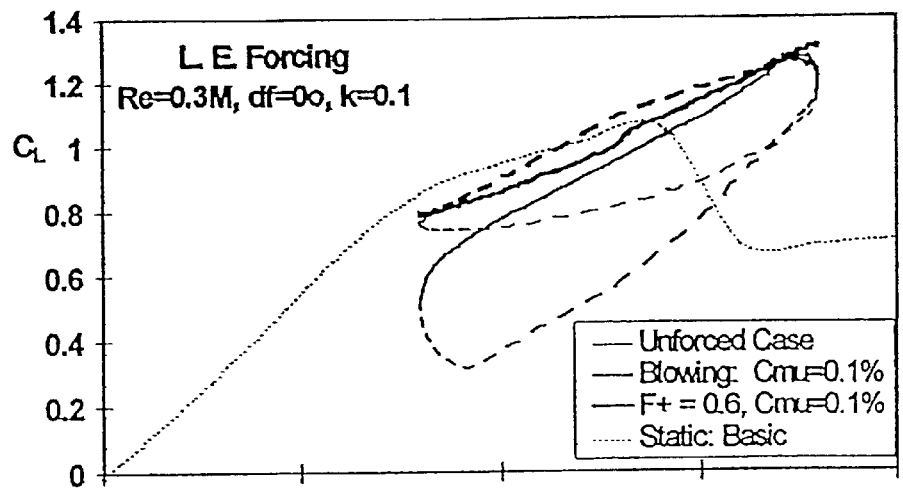
FIG. 7A is a graph of $C_L$ vs. angle of attack for the airfoil of FIG. 3, in the static regime and in a dynamic regime with neither blowing nor forcing, with steady blowing at the leading edge, and with oscillatory forcing at the leading edge.
Figure 7B:
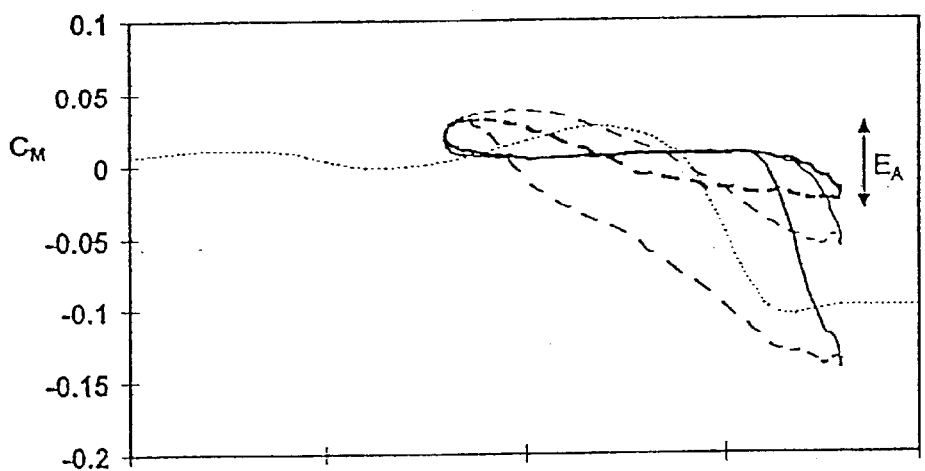
FIG. 7B is a graph of $C_M$ vs. angle of attack for the airfoil of FIG. 3, in the static regime and in a dynamic regime with neither blowing nor forcing, with steady blowing at the leading edge, and with oscillatory forcing at the leading edge.
Figure 7C:
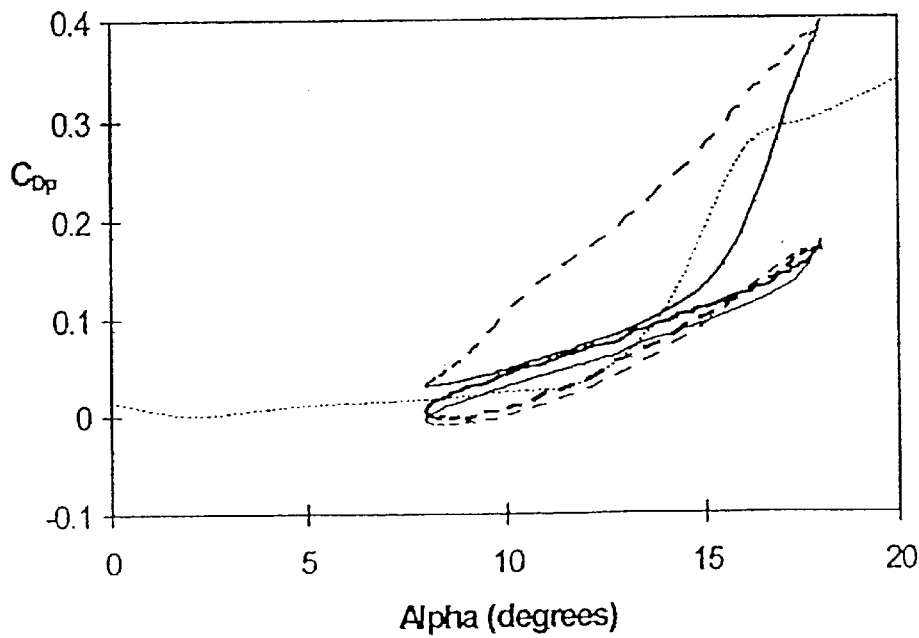
FIG. 7C is a graph of $C_{Dp}$ vs. angle of attack for the airfoil of FIG. 3, in the static regime and in a dynamic regime with neither blowing nor forcing, with steady blowing at the leading edge, and with oscillatory forcing at the leading edge.

The qualitative description of blowing and forcing from the leading-edge, given above, takes on a quantitative dimension when viewed in terms of the integral aerodynamic coefficients for lift $C_L$, moment $C_M$ and form-drag $C_{Dp}$. These quantities, together with the basic static case, are plotted in FIGS. 7A–7C respectively, where solid lines indicate the up-stroke and broken lines indicate the down-stroke. With regard to FIG. 7A, the classical lift hysteresis, with stall occurring at the maximum incidence angle, can clearly be seen. In addition, the disastrous effect of blowing on the boundary layer is clearly evident, where the flow is essentially forced to separate from the upper surface, to a greater or lesser degree, throughout the cycle. In contrast to this, forcing at the same $C_\mu$ maintains a virtually identical up-stroke with a marginal increase in $C_L(max)$ and obliterates lift hysteresis—even inverting this phenomenon for most of the cycle—thereby providing an almost linear response with α. This effect is even more dramatically demonstrated by the hysteresis loops for the moment coefficient in FIG. 7B. Here, clearly, the excursion for the basic case is outside of the allowable limit $E_A$. Moreover, FIG. 7B demonstrates that for blowing, moment-stall in fact begins at approximately 16°, earlier than lift stall, and then plunges into the abyss, resulting in excursions that are more than 3 times the allowable limit. Furthermore, and as expected, forcing delays moment stall somewhat and effectively curtails the characteristic negative moment, thereby resulting in acceptable excursions. The curves of FIG. 7C illustrate, as expected, that blowing has an extremely detrimental effect, with drag-stall commencing at approximately 15°. Forcing at this frequency has a relatively small effect on form-drag with a negligible overall increase evident. It is important to note that the effective momentum-induced thrust due to forcing and blowing has not been taken into account in the form-drag calculations. This effect can only be recovered by measuring the overall drag.

Figure 8A:
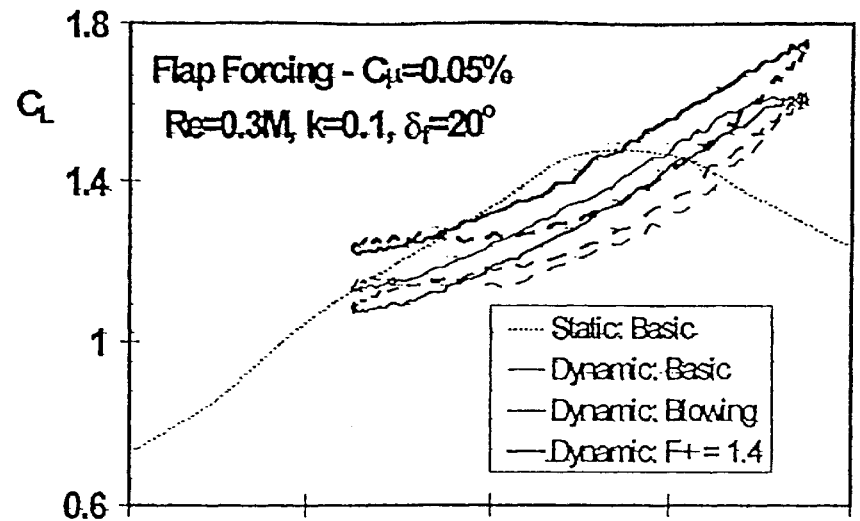
FIG. 8A is a graph of $C_L$ vs. angle of attack for the airfoil of FIG. 3, in the static regime and in a dynamic regime with neither blowing nor forcing, with steady blowing at the flap shoulder, and with oscillatory forcing at the flap shoulder.
Figure 8B:
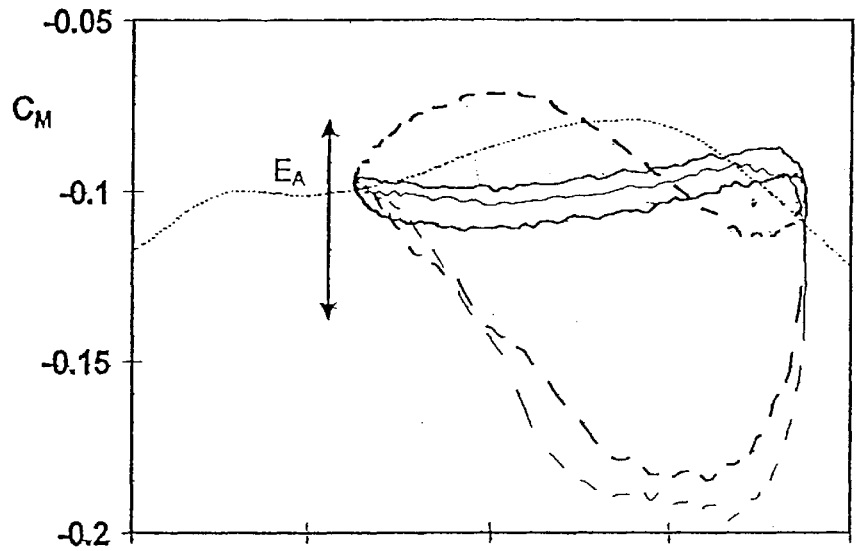
FIG. 8B is a graph of $C_M$ vs. angle of attack for the airfoil of FIG. 3, in the static regime and in a dynamic regime with neither blowing nor forcing, with steady blowing at the flap shoulder, and with oscillatory forcing at the flap shoulder.
Figure 8C:
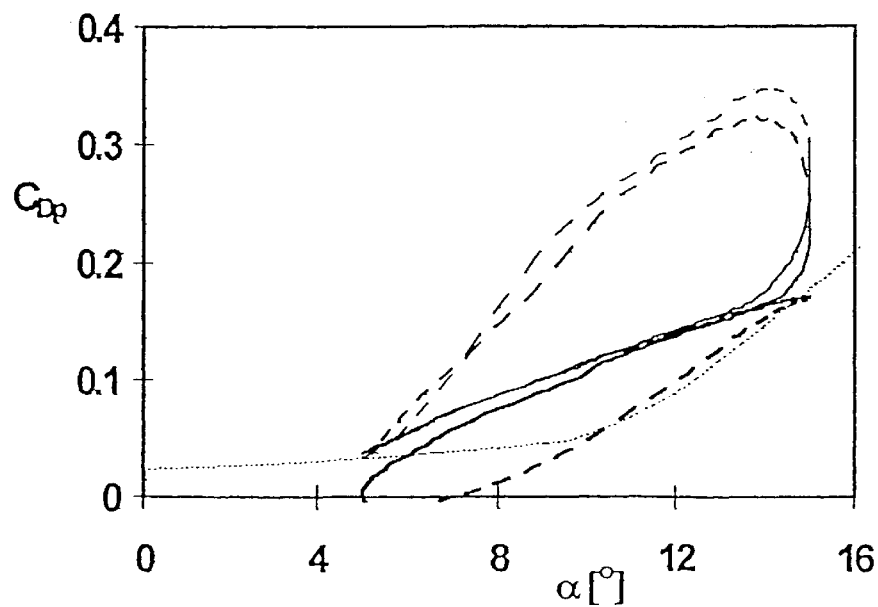
FIG. 8C is a graph of $C_{Dp}$ vs. angle of attack for the airfoil of FIG. 3, in the static regime and in a dynamic regime with neither blowing nor forcing, with steady blowing at the flap shoulder, and with oscillatory forcing at the flap shoulder.

The integral aerodynamic coefficients for the flapped case, with flap-shoulder blowing and forcing discussed earlier, are presented in FIGS. 8A–8C. Here, the first notable feature is that the $C_L$–α slope has shifted upwards as a direct result of the flap deflection. Secondly, and in accordance with the surface pressures presented in FIGS. 6A–6D, steady blowing results in relatively small effects on all three coefficients. In contrast to the leading-edge case, where large-scale separation was observed, blowing at low momentum coefficients has a small beneficial effect on overall performance, with larger excursions in $C_L$ and somewhat reduced $C_M$ and $C_{Dp}$ excursions. It should be noted however, from the allowable-excursion range ($E_A$) depicted in FIG. 8B, that blowing is unable to contain the moment excursions. In contrast to this, once again, forcing clearly contains the excursion to well within acceptable bounds. Moreover, two additional bonuses are apparent. Firstly, $C_L(max)$ is increased by about 10%. Secondly, the form-drag hysteresis is significantly modified, so-much-so that the down-stroke $C_{Dp}$ is less than that on the up-stroke. These two features illustrate important benefits of flap forcing over leading-edge forcing even at half the momentum input.

It is not claimed herein that CL(max), moment excursions $[C_M(max)-C_M(min)]$, and time-mean $C_{Dp}$ are the only quantities of importance, but in accordance with the main objective of this parametric study, these quantities serve as the best indicators of overall airfoil performance. It is evident from the work of Piziali and others that dynamic stall is a three-dimensional phenomenon. This was observed by small differences in the hysteresis loops—particularly during the down-stroke during the unforced post-stall cases, although this three-dimensional effect was significantly reduced when two-dimensional blowing or forcing were activated. Thus, the statistical design of the experiments, allowing for errors of less than 2% in the abovementioned ensemble-averaged quantities based on 99% confidence limits, typically required 25 loops for basic cases and 5 loops for cases with blowing or forcing (B. J. Brinkworth, *An Introduction To Experimentation*, Second Edition, The English Universities Press, Ltd., 1973).

Figure 9A:
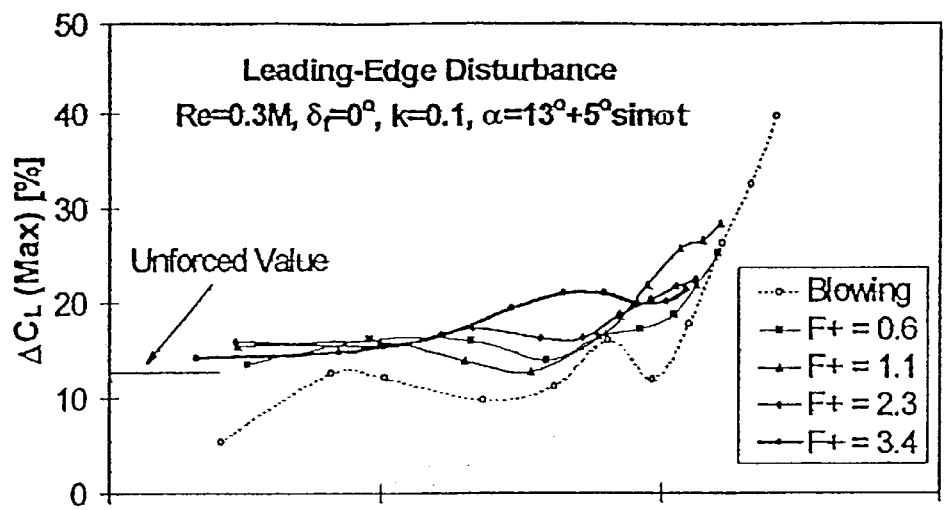
FIG. 9A is a graphical comparison of maximum $\Delta C_L$ vs. $C_\mu$ for steady blowing and oscillatory forcing at the leading edge of the airfoil of FIG. 3.
Figure 9B:
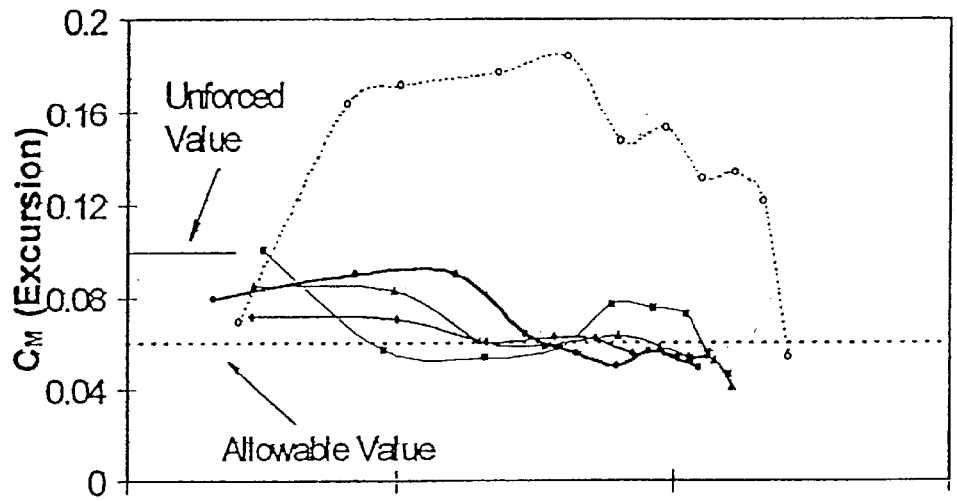
FIG. 9B is a; graphical comparison of the excursions of $C_M$ vs. $C_\mu$ for steady blowing and oscillatory forcing at the leading edge of the airfoil of FIG. 3
Figure 9C:
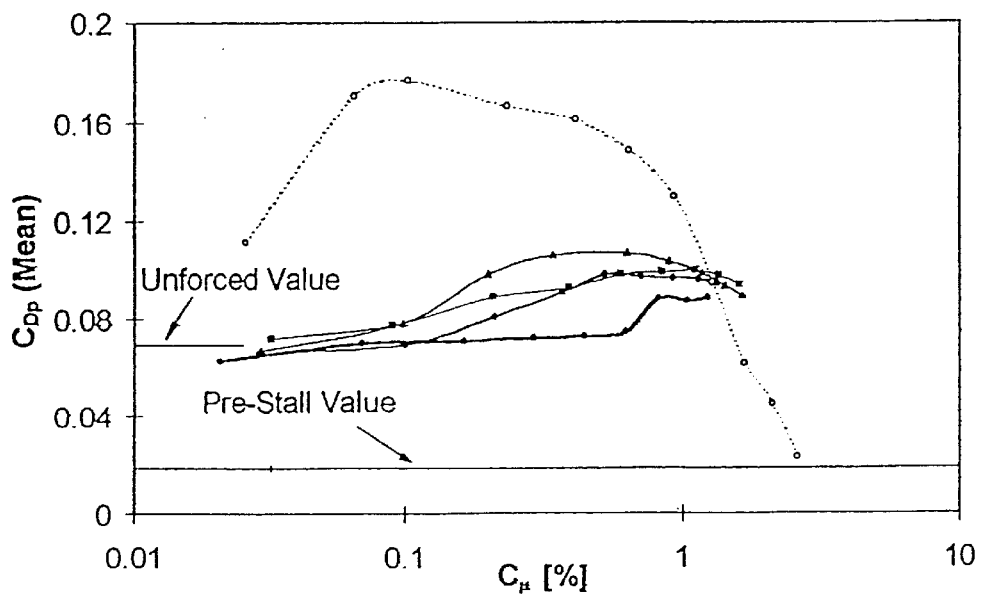
FIG. 9C is a graphical comparison of mean $C_{Dp}$ vs. $C_\mu$ for steady blowing and oscillatory forcing at the leading edge of the airfoil of FIG. 3.

FIGS. 9A–9C contain the quantities referred to in the previous paragraph for leading-edge blowing and forcing, where each data-point represents the particular ensemble-averaged quantity as it depends upon $F^+$ and $C_\mu$ (or just $C_\mu$ in the case of blowing). FIGS. 9A–9C essentially furnish a bird's-eye-view of the data, for a particular airfoil configuration, where the effects of blowing and forcing can be clearly assessed. Note that the data presented in FIGS. 5A–5C and in FIGS. 7A–7C are here represented by the third and second "Blowing" and "$F^+$=0.6" data points respectively. Here, it is important to note the following: a $C_L(max)$ data-point in FIG. 9A is only considered to be valid if the moment excursion associated with it falls below the hatched line in FIG. 9B. FIGS. 9A and 9B put the previous data into perspective, as it can be seen that for steady blowing at $C_\mu<2\%$, the maximum lift generated by the airfoil is never significantly greater than, and sometimes is less than, the unforced case. In addition, none of the points are considered valid because the moment excursions are never within the allowable limit. The oscillation evident in both the lift and moment data was checked for repeatability and, in addition, the same trends were evident with leading-edge blowing in conjunction with flap-deflection. This is an indication of an unstable, but repeatable, dependence on $C_\mu$ in this range. As the blowing rate is increased to approximately $C_\mu>3\%$, steady blowing brings about dramatic improvements in $C_L(max)$ and mean form-drag (FIG. 9C) while concomitantly, the moment excursions are brought under control. This observation is bears qualitative similarities to the flow visualization data of McAlister (see Carr, 1988). The remaining data-points represent the forcing results for various $F^+$ and $C_\mu$. Here, it is immediately clear that $C_L(max)$ data are always greater than or equal to both unforced and blowing data. In addition, and more importantly, for the corresponding maximum lift increment, allowable values of moment excursion are attained. Consequently, each moment-excursion data point falling below the hatched line is considered to be valid. Focusing attention more closely on the moment excursion data reveals a phenomenon which flies in the face of conventional wisdom. Here, as well as an optimum or resonant frequency, an optimum or range of optimum $C_\mu$'s are evident. This is illustrated by the local minima and maxima—particularly for the lower $F^+$ cases. From a visual real-time display of the surface pressures, it became evident that at these critical $C_\mu$'s the flow at the surface appeared to be resonating—probably due to the generation of large scale traveling structures above the airfoil surface—much like the forced static experiments (A. Seifert, A. Darabi and I. Wygnanski, "Delay of airfoil stall by periodic excitation", *Journal of Aircraft*, Vol. 33 No. 4, pp. 691–698 (1996)). In this investigation, however, no attempt was made to measure the amplitude and phase-velocity of the large-scale vortical structures generated by the forcing. In the future this phenomenon should be considered because it may provide a direct link between the dynamic case and the static case (e.g. Seifert et al, 1996). At the higher $C_\mu$, where the moment excursions had become unreasonably large at lower $F^+$, the higher frequency forcing data was within acceptable limits. Thus no single frequency is capable of maintaining allowable excursions for the $C_\mu$ range investigated here. The form-drag graph (FIG. 9C) indicates that forcing at all frequencies is far superior to blowing at a given $C_\mu$, but there are small increases in form-drag with increasing momentum input. This increased drag effect appears to attenuate somewhat with increasing $F^+$. It is pointed out, once again, that the effective thrust of the momentum input was not accounted for here.

Figure 10A:
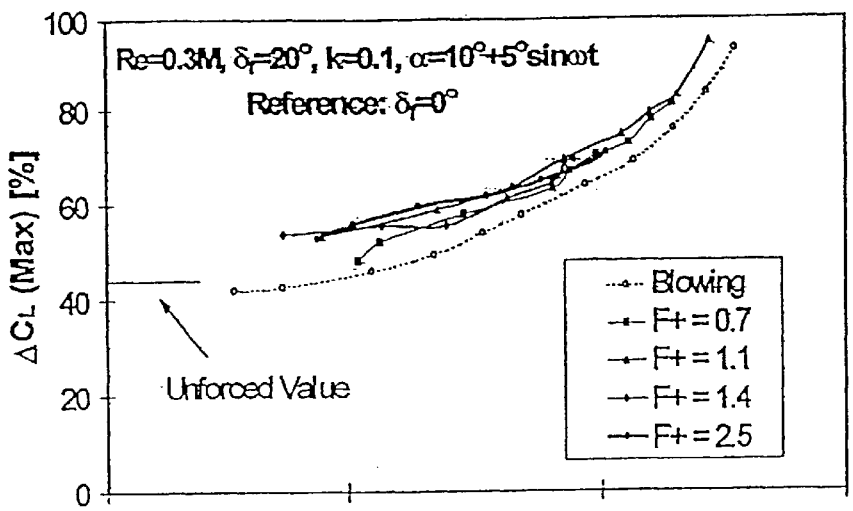
FIG. 10A is a graphical comparison of maximum $\Delta C_L$ vs. $C_\mu$ for steady blowing and oscillatory forcing at the flap shoulder of the airfoil of FIG. 3.
Figure 10B:
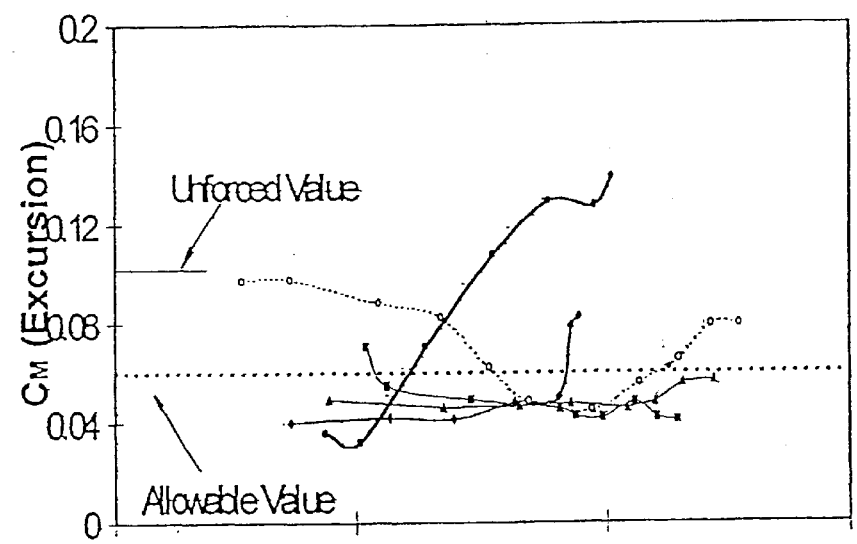
FIG. 10B is a; graphical comparison of the excursions of $C_M$ vs. $C_\mu$ for steady blowing and oscillatory forcing at the flap shoulder of the airfoil of FIG. 3
Figure 10C:
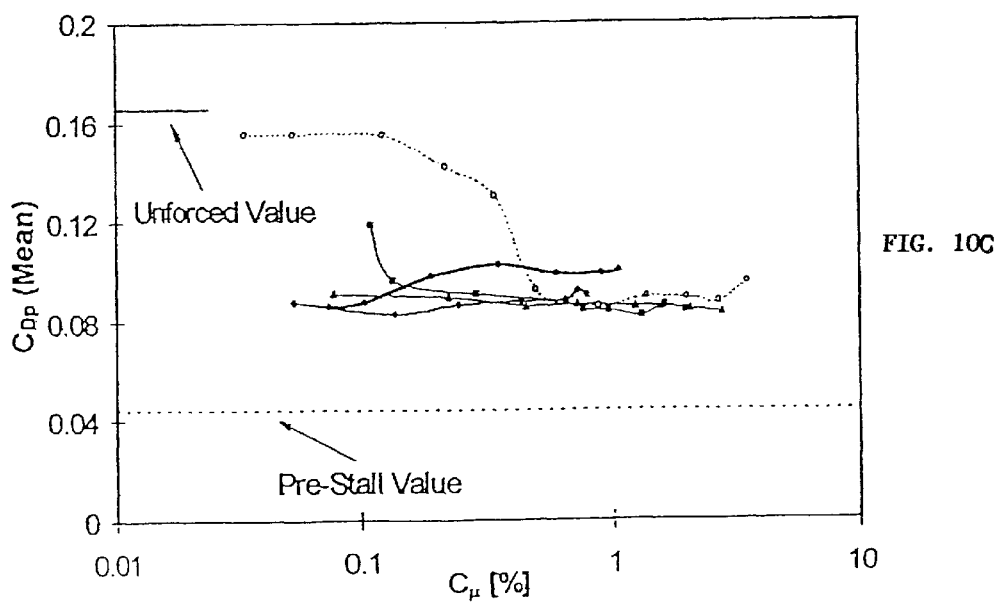
FIG. 10C is a graphical comparison of mean $C_{Dp}$ vs. $C_\mu$ for steady blowing and oscillatory forcing at the flap shoulder of the airfoil of FIG. 3.

The identical representation of data as in FIGS. 9A–9C, but here for the flapped case described in FIGS. 6A–6D and FIGS. 8A–8C, is presented in Figures 10A–10C. Immediately noticeable is the significant overall increase in lift in FIG. 10A, as here the $C_L$(max) increment is referenced to the un-flapped case. Notice that while deflecting the flap by 20° without forcing or blowing increases the maximum lift by some 44%, the moment excursions become unacceptably large. The introduction of blowing from the flap slightly decreases the maximum at small $C_\mu$, and it then increases monotonically with additional momentum input. The moment excursions, corresponding to steady blowing, decrease gradually with increasing $C_\mu$ and only attain acceptable values for approximately $0.3\%<C_\mu<2.0\%$. The mean form-drag also begins to show significant decreases at $C_\mu \approx 0.3\%$. It is of note that in the context of steady flap-shoulder blowing, a conclusion similar to that drawn in FIGS. 9A–9C for leading-edge forcing is obtained, namely: higher blowing rates are not necessarily better for dynamic stall. The remaining data points on the graphs refer exclusively to forcing at different frequencies. Important to note, is that the second and first "Blowing" and "$F^+$=1.4" data points respectively were extracted from the hysteresis loops of FIGS. 8A–8C. In FIGS. 10A and 10B an encouraging phenomenon is seen, namely: at exceedingly small $C_\mu$, increases of greater than 50% can be achieved in $C_L$(max) while simultaneously containing the moment excursions. Added to this, the form-drag is reduced to less than half of its unforced value. It is important to note that no attempt was made to find the minimum value of $C_\mu$ at which the moment excursions were maintained, although, if the detailed investigation of Nishri & Wygnanski ("On flow separation and its control", in *Computational Methods in Applied Science*, John Wiley & Sons Ltd., 1996) is any indication, $C_\mu$ can probably be reduced further by at least one order of magnitude. As Nishri & Wygnanski showed that the flap configuration is bi-stable, at least under static conditions, it remains a distinct possibility to attach the separated flap flow and then reduce the momentum input a further order of magnitude.

Figure 11A:
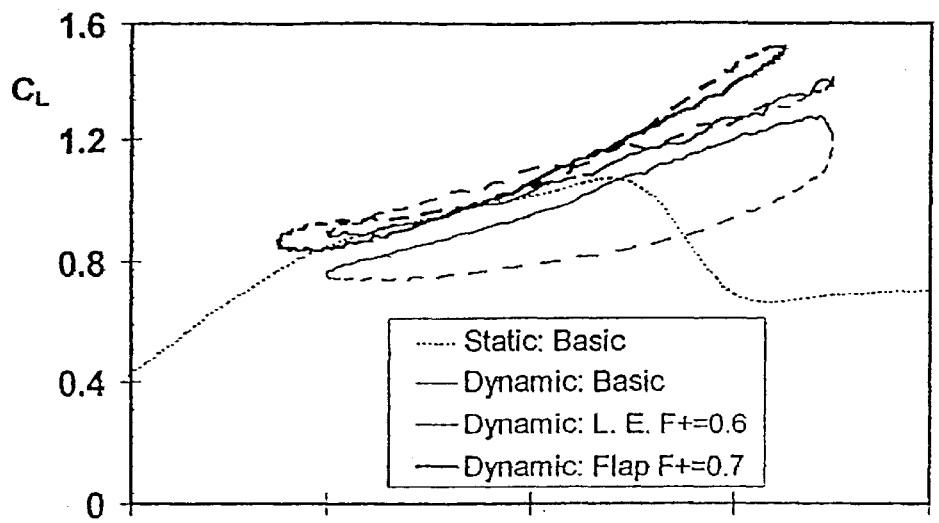
FIG. 11A is a graph of $C_L$ vs. angle of attack for the airfoil of FIG. 3, in the static regime and in a dynamic regime with neither blowing nor forcing, with oscillatory forcing at the leading edge, and with oscillatory forcing at the flap shoulder.
Figure 11B:
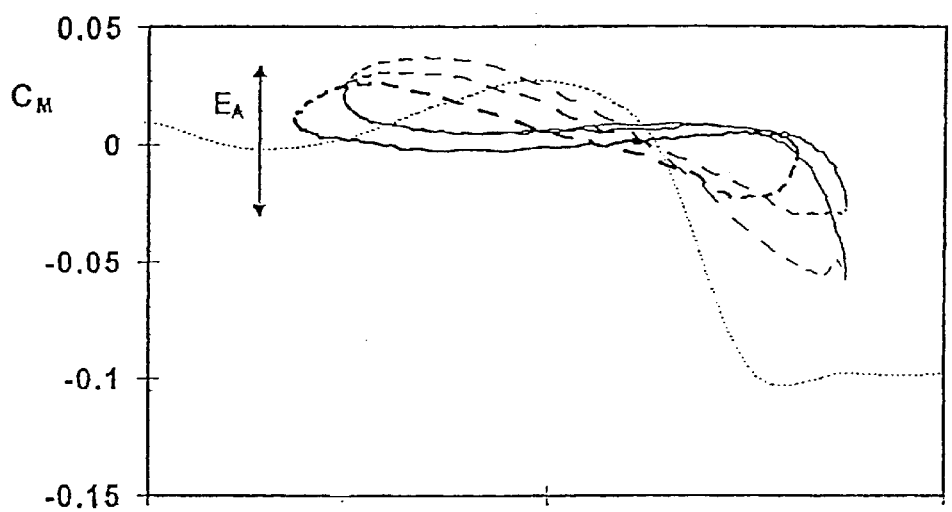
FIG. 11B is a graph of $C_M$ vs. angle of attack for the airfoil of FIG. 3, in the static regime and in a dynamic regime with neither blowing nor forcing, with oscillatory forcing at the leading edge, and with oscillatory forcing at the flap shoulder.
Figure 11C:
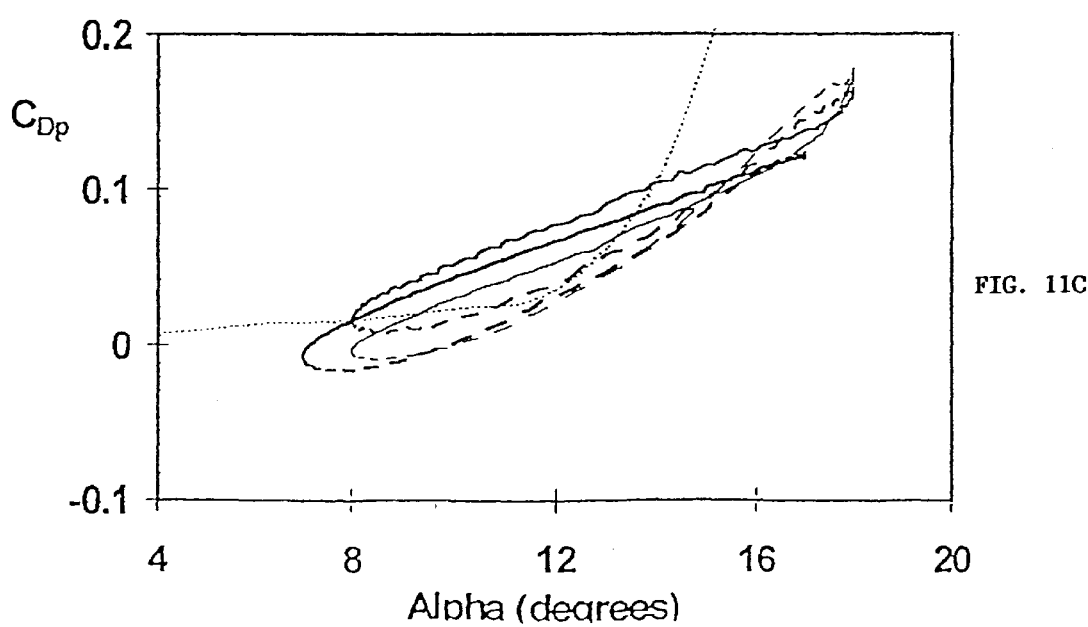
FIG. 11C is a graph of $C_{Dp}$ vs. angle of attack for the airfoil of FIG. 3, in the static regime and in a dynamic regime with neither blowing nor forcing, with oscillatory forcing at the leading edge, and with oscillatory forcing at the flap shoulder.

A question still not resolved is how flap-shoulder forcing and leading-edge forcing compare for $\delta_f=0°$ (i.e. a symmetric airfoil). Intuitively, and on the basis of all attempts to control dynamic stall, control from the leading-edge region should yield the best results. The results presented in FIGS. 11A–11C, however, indicate precisely the opposite. Here, the aerodynamic coefficients are plotted for a high $C_\mu$-low $F^+$ scenario. This specific case was selected arbitrarily, as the basic trends are the same for almost all (see next paragraph) $C_\mu$ and $F^+$ combinations. FIG. 11A indicates that leading-edge forcing increases $C_L$(max) but flap-shoulder forcing further increases $C_L$(max), where both essentially eliminate hysteresis. Furthermore, with flap-forcing, the $C_L$ excursions, which ultimately determine rotorcraft performance, are larger than the basic case, while this is not the case for leading-edge forcing. FIG. 11B illustrates that both methods of forcing are able to contain the moment excursions, with the flap forcing cases providing a larger measure of excursion control. In keeping with the trends of previous data, the form-drag hysteresis is inverted (FIG. 11C), resulting in mean values which are significantly lower than that achieved with forcing.

Figure 12A:
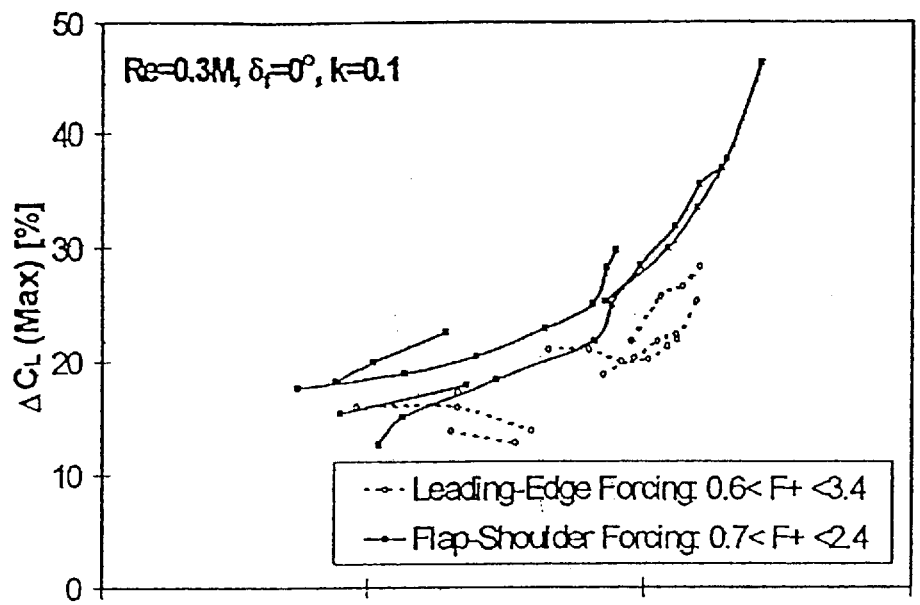
FIG. 12A is a graphical comparison of maximum $\Delta C_L$ vs. $C_\mu$ for oscillatory forcing at the leading edge and at the flap shoulder of the airfoil of FIG. 3 with a flap angle of 0°.
Figure 12B:
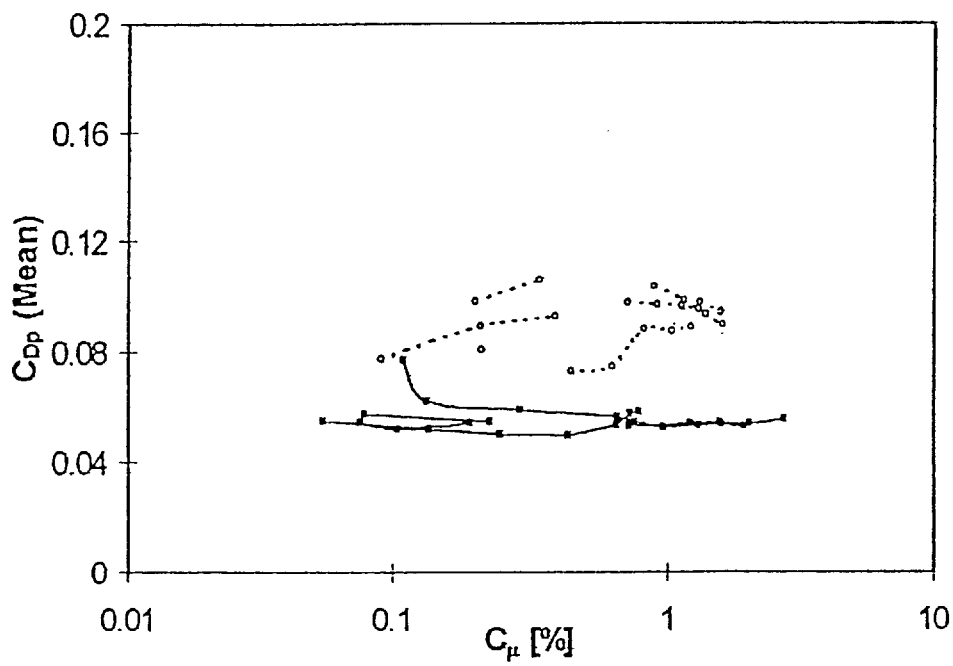
FIG. 12B is a graphical comparison of mean $C_{Dp}$ vs. $C_\mu$ for oscillatory forcing at the leading edge and at the flap shoulder of the airfoil of FIG. 3 with a flap angle of 0°.

An overall comparison for the $\delta_f=0°$ case is presented in FIGS. 12A and 12B, which contain a comparison of $\Delta C_L$ (max) and mean $C_{Dp}$ for leading-edge and flap-shoulder across the $F^+$ and $C_\mu$ spectrum, where only the data that falls within acceptable moment-excursion limits is plotted. From FIG. 12A, the following is immediately obvious: on the whole, flap-shoulder forcing is more effective for increasing lift in spite of the fact that a symmetric airfoil is employed. This finding certainly contradicts much of the conventional wisdom associated with dynamic-stall management. Moreover, leading-edge forcing is more erratic in the sense that moment excursion reduction depends relatively strongly on both frequency and momentum RMS input. This is visible in the number of isolated data points in FIGS. 12A and 12B. Additionally, leading-edge forcing is completely ineffective at low $C_\mu$, while lift does not always increase with momentum input, but, depending on the frequency, exhibits local maxima. On the other hand, in the case of flap forcing, variations in lift and moment-excursion are approximately monotonic with $C_\mu$-essentially effective over the entire $C_\mu$ range considered. FIG. 12B, which contains the mean form-drag comparison, shows that flap forcing reduced form-drag more effectively than leading-edge forcing. Moreover, increases in $C_\mu$ tend to increase mean $C_{Dp}$ for leading-edge forcing, whereas this quantity decreases slightly with $C_\mu$ for flap forcing. When considering this comparison, it is important to note that $C_{Dp}$ was extremely sensitive to airfoil geometry—particularly in the leading-edge region. So-much-so, that when leading-edge slot 64 was closed (with tape) for the trailing edge forcing, the basic form-drag nearly doubled. In spite of this, the flap-shoulder forcing still brings about lower mean form-drag.

Figures 13A, 13B:
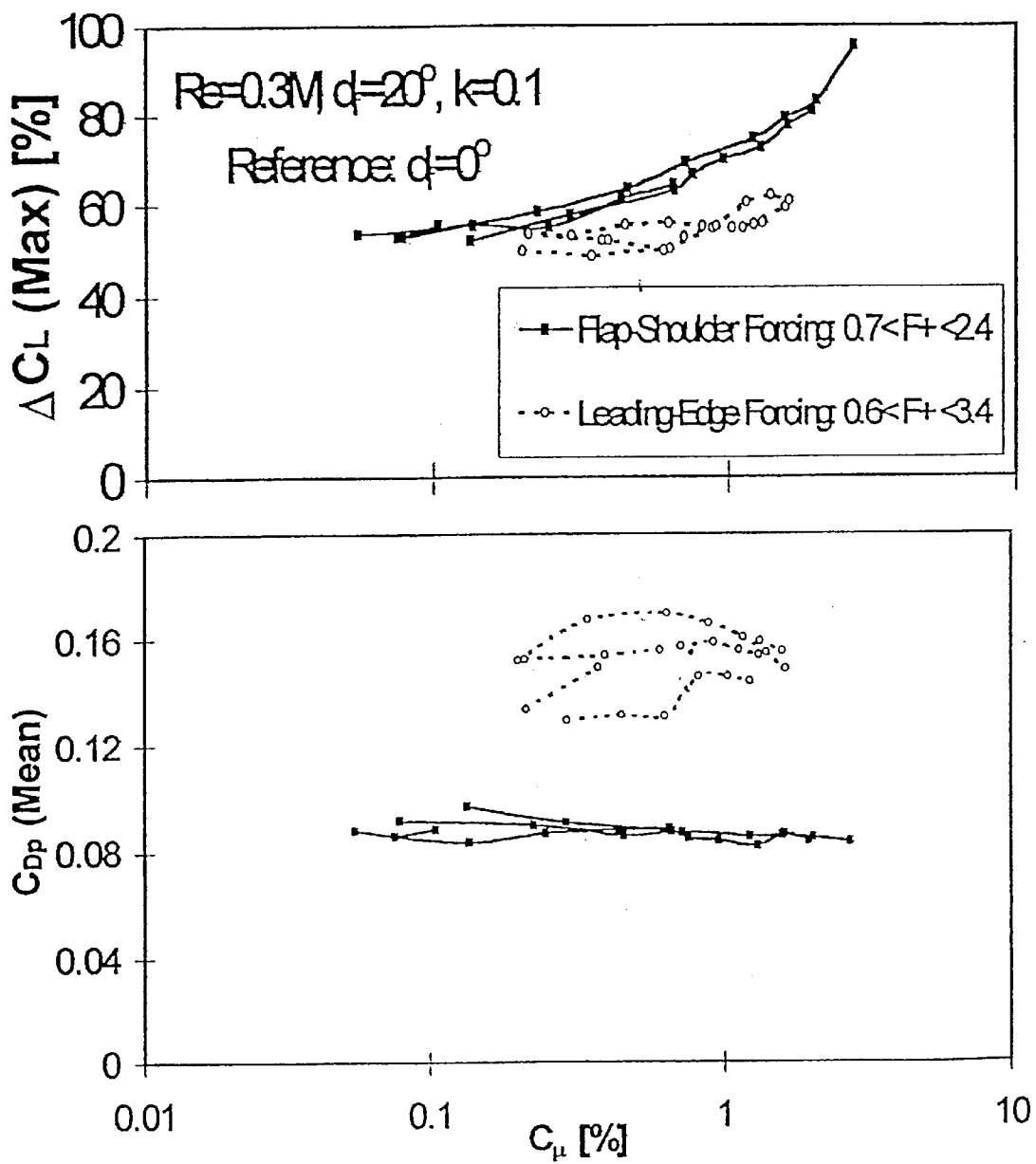
FIG. 13A is a graphical comparison of maximum $\Delta C_L$ vs. $C_\mu$ for oscillatory forcing at the leading edge and at the flap shoulder of the airfoil of FIG. 3 with a flap angle of 20°.
FIG. 13B is a graphical comparison of mean $C_{Dp}$ vs. $C_\mu$ for oscillatory forcing at the leading edge and at the flap shoulder of the airfoil of FIG. 3 with a flap angle of 20°.

FIGS. 13A and 13B illustrate the same comparison as FIGS. 12A and 12B, with the exception of the flap deflection angle, which is deflected to 20° for both cases. FIGS. 13A and 13B essentially confirm all the findings of the previous Figures, with the exception that all the effects are essentially magnified, namely, maximum lift increases and reductions in mean form-drag are much more significant for the flapped case. Recall that the flapped configuration is simply meant to simulate an aft-loaded configuration. The intention here is not necessarily to promote their use on rotorcraft but to illustrate the powerful combined effect of aft-loading with forcing.

While the invention has been described with respect to a limited number of embodiments, it will be appreciated that many variations, modifications and other applications of the invention may be made.

What is claimed is:

1. A method for inhibiting dynamic stall of an airfoil having a leading edge and a trailing edge that define a chord therebetween, as the airfoil executes a pitching motion at a frequency of airfoil oscillation, comprising a step selected from the group consisting of:
    (a) causing a fluid to flow through at least one location on the airfoil within about one quarter of the chord from the leading edge, said flow being with a zero net mass flux;
    (b) causing a fluid to flow through at least one location on the airfoil within about one quarter of the chord from the leading edge, said flow being with a non-zero net mass flux and modulated at a first frequency of oscillatory forcing described by a Strouhal ratio greater than about one; and
    (c) causing said fluid to flow through at least one location on the airfoil beyond about one quarter of the chord from the leading edge.
2. The method of claim 1, wherein said fluid is a gas.
3. The method of claim 2, wherein said gas is air.
4. The method of claim 1, wherein said flow of said fluid through said at least one location within about one quarter of the chord from the leading edge is oscillatory.

5. The method of claim 1, wherein said flow of said fluid through said at least one location beyond about one quarter of the chord from the leading edge is steady.

6. The method of claim 1, wherein said flow of said fluid through said at least one location beyond about one quarter of the chord from the leading edge is with a non-zero net mass flux, modulated at a second frequency described by a Strouhal ratio greater than about one.

7. The method of claim 1, wherein said flow of said fluid from said at least one location beyond about one quarter of the chord from the leading edge is oscillatory.

8. A method for inhibiting dynamic stall in an airfoil having a surface, the airfoil moving through a medium and executing a pitching motion at a frequency of airfoil oscillations the method comprising the step of establishing an oscillation in said medium adjacent to at least one location on said surface of the airfoil, said oscillation being modulated at a frequency of oscillatory forcing described by a Strouhal ratio greater than about one.

9. The method of claim 8, wherein said oscillation is established using an oscillatory mechanical device positioned at said at least one location.

10. The method of claim 8, wherein said oscillation is established by causing a fluid to flow through said at least one location.

11. The method of claim 10, wherein said fluid is a gas.

12. The method of claim 11, wherein said gas is air.

13. A rotary wing aircraft, for motion through a medium, comprising an airfoil that includes:
(a) an upper surface;
(b) a lower surface, said upper surface and said lower surface meeting at a leading edge and at a trailing edge, said upper surface and said lower surface defining between them an interior, said leading edge and said trailing edge defining between them a chord;
(c) at least one aperture in a location selected from the group consisting of:
(i) locations in said upper surface beyond about one quarter of said chord from said leading edge,
(ii) locations in said lower surface beyond about one quarter of said chord from said leading edge, and
(iii) locations along said trailing edge; and
(d) a mechanism for causing oscillatory flow of a fluid between said medium and said interior via said at least one aperture at a Strouhal ratio greater than about one.

14. The airfoil of claim 13, wherein said mechanism includes an acoustic speaker.

15. The airfoil of claim 13, wherein said mechanism includes a piezoelectric element.

16. The airfoil of claim 13, wherein said fluid is a gas.

17. The airfoil of claim 13, wherein said gas is air.

18. A rotary wing aircraft for motion through a medium, comprising an airfoil that includes:
(a) an upper surface;
(b) a lower surface, said upper surface and lower surface meeting at a leading edge and at a trailing edge, said upper surface and said lower surface defining between them an interior, said leading edge and said trailing edge defining between them a chord, each of said upper surface and said lower surface having a certain shape; and
(c) a mechanism for oscillating a portion of the medium adjacent to at least one location selected from the group consisting of:
(i) locations in said upper surface,
(ii) locations in said lower surface,
(iii) locations along said leading edge, and
(iv) locations along said trailing edge,
wherein said mechanism oscillates at a Strouhal ratio greater than about one.

19. The airfoil of claim 18, wherein said mechanism for oscillating said portion of the medium includes, at each of said at least one location selected from the group consisting of locations in said upper surface and locations in said lower surface, a mechanism for oscillating said shape.

20. The airfoil of claim 18, wherein said mechanism for oscillating said portion of the medium includes:
(i) at each of said at least one location, an aperture, and
(ii) a mechanism for causing a fluid to flow through said at least one aperture.

21. The airfoil of claim 20, wherein said mechanism for causing said fluid to flow through said at least one aperture includes an acoustic speaker.

22. The airfoil of claim 20, wherein said mechanism for causing said fluid to flow through said at least one aperture includes a piezoelectric element.

23. The airfoil of claim 20, wherein said fluid is a gas.

24. The airfoil of claim 20, wherein said gas is air.

25. A rotary wing aircraft, for motion through a medium, comprising an airfoil that includes:
(a) an upper surface;
(b) a lower surface, said upper surface and said lower surface meeting at a leading edge and at a trailing edge, said upper surface and said lower surface defining between them an interior, said leading edge and said trailing edge defining between them a chord;
(c) at least one aperture in a location selected from the group consisting of:
(i) locations in said upper surface within about one quarter of said chord from said leading edge,
(ii) locations in said lower surface within about one quarter of said chord from said leading edge, and
(iii) locations along said leading edge; and
(d) a mechanism for causing a fluid to flow between said medium and said interior via said at least one aperture, said flow being with a non-zero net mass flux and modulated at a first frequency of oscillatory forcing described by a Strouhal ratio greater than about one.

26. The airfoil of claim 25, wherein said mechanism causes oscillatory flow of said fluid.

27. The airfoil of claim 26, wherein said mechanism includes an acoustic speaker.

28. The airfoil of claim 26, wherein said mechanism includes a piezoelectric element.

29. A rotary wing aircraft, for motion through a medium, comprising an airfoil that includes:
(a) an upper surface;
(b) a lower surface, said upper surface and said lower surface meeting at a leading edge and at a trailing edge, said upper surface and said lower surface defining between them an interior, said leading edge and said trailing edge defining between them a chord;
(c) at least one aperture in a location selected from the group consisting of:
(i) locations in said upper surface between said leading edge and said trailing edge,
(ii) locations in said upper surface between said leading edge and said trailing edge,
(iii) locations along said leading edge, and
(iv) locations along said trailing edge; and (d) a mechanism for causing oscillatory flow of a fluid between said medium and said interior via said at least one aperture at a Strouhal ratio greater than about one.

30. The aircraft of claim 18, wherein said mechanism includes:
   (i) at each of said at least one location, a respective aperture; and
   (ii) a mechanism for causing a respective rod to oscillate in each said at least one aperture.

31. The aircraft of claim 30, wherein said mechanism for causing said rod to oscillate includes an acoustic speaker.

32. The aircraft of claim 30, wherein said mechanism for causing said rod to oscillate includes a piezoelectric element.

33. The aircraft of claim 18, wherein said mechanism for oscillating said portion of the medium includes:
   (i) at each of said at least one location, a plate, mounted on a hinge, and
   (ii) a rotating cam for causing said plate to oscillate.

34. The aircraft of claim 18, wherein said mechanism includes, at each of said at least one location, an aperture within which a pinwheel is rotatably mounted.

35. The aircraft of claim 34, wherein said mechanism includes a motor for driving said at least one pinwheel.

* * * * *